United States Patent [19]

Parmet

[11] 4,019,033
[45] Apr. 19, 1977

[54] CONTROL STORE CHECKING SYSTEM AND METHOD

[75] Inventor: Arthur A. Parmet, Waltham, Mass.

[73] Assignee: Honeywell Information Systems, Inc., Waltham, Mass.

[22] Filed: Dec. 29, 1975

[21] Appl. No.: 644,678

[52] U.S. Cl. .............. 235/153 AM; 235/153 AK; 340/173 BB; 340/174 ED
[51] Int. Cl.² .............. G11C 29/00; G06F 11/10
[58] Field of Search ............ 235/153 AC, 153 AK, 235/153 AM; 340/172.5, 173 BB, 174 ED

[56] References Cited
UNITED STATES PATENTS

| | | | |
|---|---|---|---|
| 3,949,205 | 4/1976 | Hubert et al. | 235/153 AM |
| R28,421 | 5/1975 | Rouse | 235/153 AM |

Primary Examiner—R. Stephen Dildine, Jr.
Attorney, Agent, or Firm—Faith F. Driscoll; Nicholas Prasinos; Ronald T. Reiling

[57] ABSTRACT

A control store system provides for automatic detection of errors produced by faults in the circuits of the system during both normal and test operations. The system includes a control store and associated address and control circuits. The address and control circuits include a plurality of control address registers and an incrementing circuit. Each storage location of the control store includes a previously generated parity check bit which represents odd parity for the address corresponding to the next sequential storage location. Each of the control registers couples to a parity check circuit. Each time the contents of a storage location within the control store memory are accessed, the parity check circuit of the register receiving the address contents produced by the incrementing circuit is checked for odd parity to determine whether the information accessed is correct and whether the incrementing circuit, the registers, and associated paths are free of faults.

22 Claims, 15 Drawing Figures

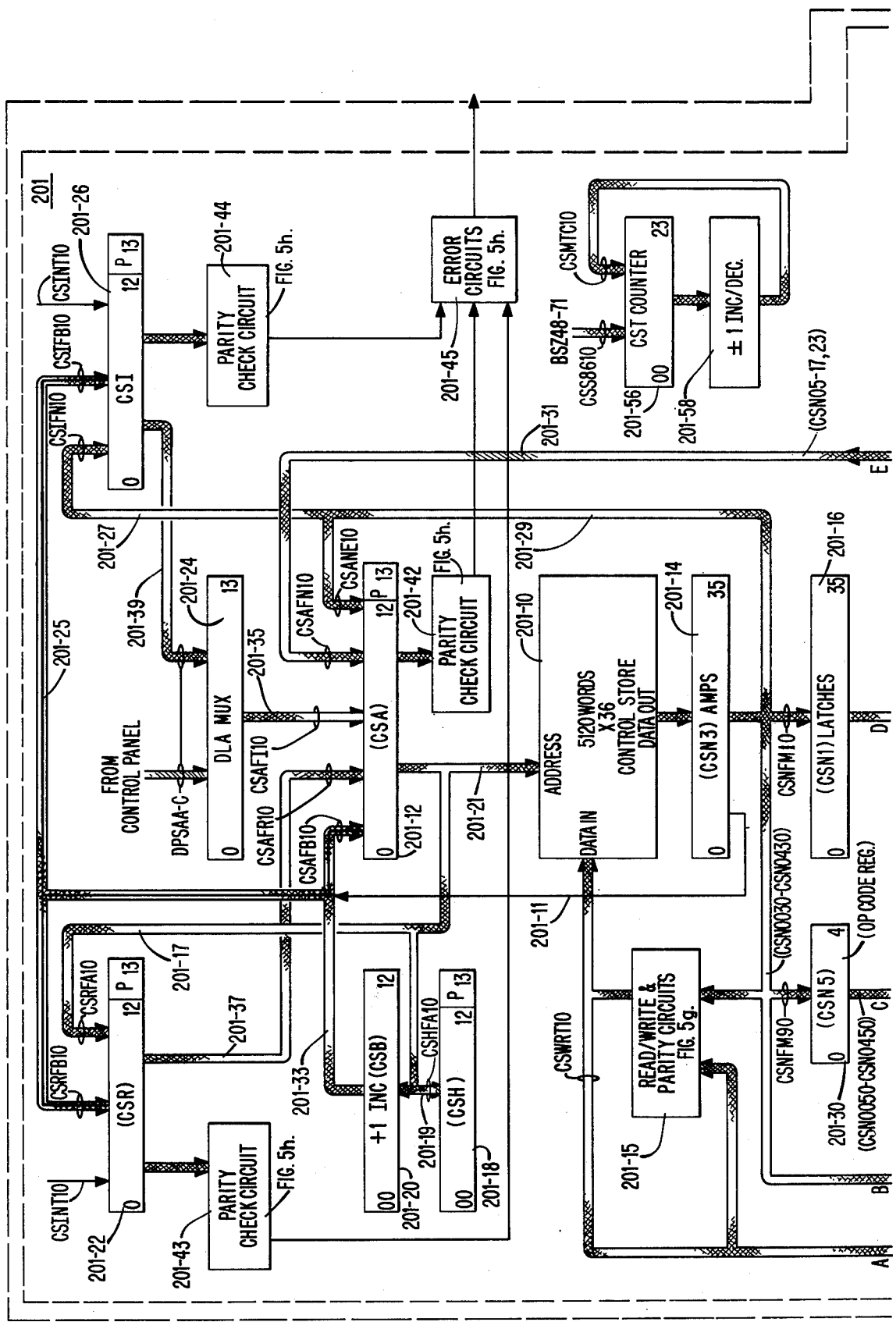
Fig. 2 (Sheet 1 of 2).

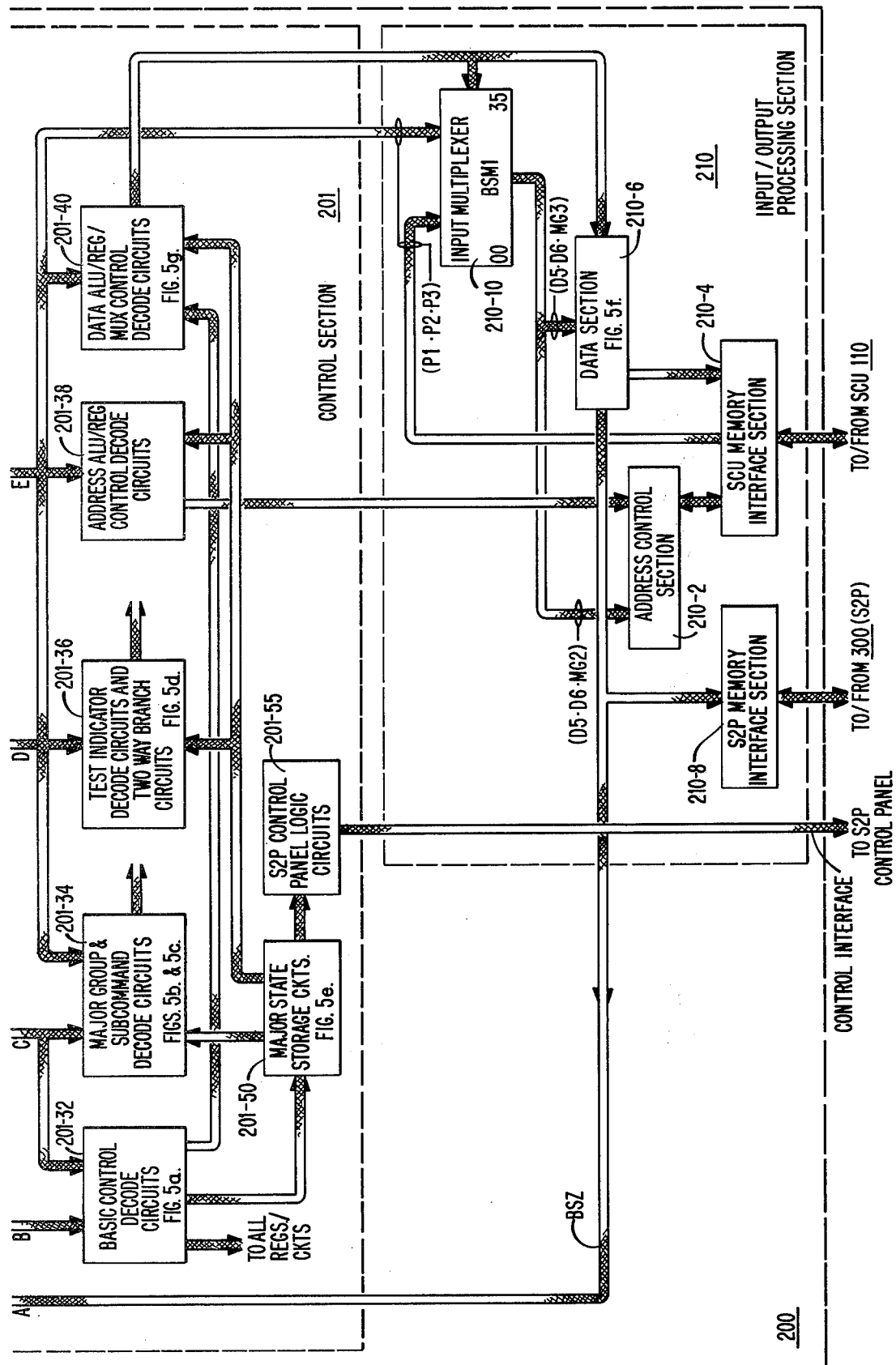
Fig. 2 (Sheet 2 of 2).

MICROINSTRUCTION FORMATS

| MAJOR GROUP | μ INST. | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|---|
| | BIT → | OP CODE | | | | | OPERANDS | | | | | | | | | | | | | | | | | | | | | | | | | PI | PO | P1 | P2 | P3 |
| 0 | NOOP | 0 | 0 | 0 | 0 | 0 | | | | | | | | | | | | | | | | | | | | | | | | | | | | | | | |
| 1 | MMRO | 0 | 0 | 0 | 1 | 0 | K0 | K1 | K2 | K3 | K4 | Z1 | Z2 | Z3 | Z4 | 0 | 0 | 0 | 0 | PG | LIM | S6 | S6 | 0 | 0 | S7 | S7 | S8 | S8 | S8 | | | | | | |
| 2 | ARCA | 0 | 0 | 1 | 0 | 0 | M1 | M2 | M3 | M4 | M5 | CI | D1 | D2 | 0 | P1 | P2 | P3 | R | PG | D5 | D6 | S6 | S6 | D7 | D8 | S7 | S7 | S8 | S8 | S8 | | | | | | |
| 2 | ARCL | 0 | 0 | 1 | 0 | 1 | M1 | M2 | M3 | M4 | M5 | 0 | D1 | D2 | 0 | P1 | P2 | P3 | R | PG | D5 | D6 | S6 | S6 | D7 | D8 | S7 | S7 | S8 | S8 | S8 | | | | | | |
| 3 | DRCA | 0 | 0 | 1 | 1 | 0 | M1 | M2 | M3 | M4 | M5 | CI | D1 | D2 | D3 | D4 | P1 | P2 | P3 | P4 | D5 | D6 | P5 | P6 | D7 | D8 | S7 | S7 | S8 | S8 | S8 | | | | | | |
| 3 | DRCL | 0 | 0 | 1 | 1 | 1 | M1 | M2 | M3 | M4 | M5 | 0 | D1 | D2 | D3 | D4 | P1 | P2 | P3 | P4 | D5 | D6 | P5 | P6 | D7 | D8 | S7 | S7 | S8 | S8 | S8 | | | | | | |
| 3 | LDC | 0 | 1 | 0 | 0 | 0 | C23 ••• C26 | | | | | C1 | C2 | C3 | C4 | C5 | C6 | C7 | C8 | C9 | C10 | C11 | C12 | C13 | C14 | C15 | C16 | C17 | C18 | C19 | ••• | C22 | | | | | |
| 4 | DCK1 | 0 | 1 | 0 | 0 | 1 | S1 | S1 | S1 | S2 | S2 | S2 | S3 | S3 | S3 | S4 | S4 | S4 | S5 | S5 | S5 | S6 | S6 | 0 | 0 | S7 | S7 | S8 | S8 | S8 | | | | | | | |
| 4 | DCK2 | 0 | 1 | 0 | 1 | 0 | S9 | S9 | S9 | S10 | S10 | S10 | S11 | S11 | S11 | S12 | S12 | S12 | S13 | S13 | S13 | S6 | S6 | 0 | 0 | S7 | S7 | S8 | S8 | S8 | | | | | | | |
| 5 | CBOTN | 0 | 1 | 0 | 1 | 1 | A0 | A1 | A2 | A3 | A4 | A5 | A6 | A7 | A8 | A9 | A10 | A11 | T1 | T1 | T1 | T1 | T1 | PA | T2 | T2 | T2 | T2 | T2 | 0 | | | | | | | |
| 5 | CBOTE | 0 | 1 | 1 | 0 | 0 | A0 | A1 | A2 | A3 | A4 | A5 | A6 | A7 | A8 | A9 | A10 | A11 | T1 | T1 | T1 | T1 | T1 | PA | T2 | T2 | T2 | T2 | T2 | 0 | | | | | | | |
| 5 | CBRTN | 0 | 1 | 1 | 0 | 1 | A0 | A1 | A2 | A3 | A4 | A5 | A6 | A7 | A8 | A9 | A10 | A11 | T1 | T1 | T1 | T1 | T1 | PA | T2 | T2 | T2 | T2 | T2 | 0 | | | | | | | |
| 5 | CBRTE | 0 | 1 | 1 | 1 | 0 | A0 | A1 | A2 | A3 | A4 | A5 | A6 | A7 | A8 | A9 | A10 | A11 | T1 | T1 | T1 | T1 | T1 | PA | T2 | T2 | T2 | T2 | T2 | 0 | | | | | | | |
| 6 | LCSIK | 0 | 1 | 1 | 1 | 1 | A0 | A1 | A2 | A3 | A4 | A5 | A6 | A7 | A8 | A9 | A10 | A11 | A12 | 0 | 0 | S6 | S6 | 0 | 0 | S7 | S7 | S8 | S8 | S8 | | | | | | | |
| 7 | UCBK | 1 | 0 | 0 | 0 | 0 | A0 | A1 | A2 | A3 | A4 | A5 | A6 | A7 | A8 | A9 | A10 | A11 | A12 | 0 | 0 | S6 | S6 | 0 | 0 | S7 | S7 | S8 | S8 | S8 | | | | | | | |
| 7 | UBRK | 1 | 0 | 1 | 0 | 1 | A0 | A1 | A2 | A3 | A4 | A5 | A6 | A7 | A8 | A9 | A10 | A11 | A12 | 0 | 0 | S6 | S6 | 0 | 0 | S7 | S7 | S8 | S8 | S8 | | | | | | | |
| 7 | RTNFI | 1 | 1 | 0 | 0 | 0 | 0 | | | | | | | | | | | | 0 | 0 | 0 | 1 | S6 | S6 | 0 | 0 | S7 | S7 | S8 | S8 | S8 | | | | | | | |
| 7 | RTFIR | 1 | 1 | 0 | 0 | 1 | 0 | | | | | | | | | | | | 0 | 0 | 0 | 1 | S6 | S6 | 0 | 0 | S7 | S7 | S8 | S8 | S8 | | | | | | | |
| 7 | RTNER | 1 | 1 | 0 | 1 | 0 | 0 | | | | | | | | | | | | 0 | 0 | 1 | 0 | S6 | S6 | 0 | 0 | S7 | S7 | S8 | S8 | S8 | | | | | | | |
| 7 | RTFRR | 1 | 1 | 0 | 1 | 1 | 0 | | | | | | | | | | | | 0 | 0 | 1 | 0 | S6 | S6 | 0 | 0 | S7 | S7 | S8 | S8 | S8 | | | | | | | |
| 7 | CSMR | 1 | 1 | 1 | 0 | 1 | 0 | | | | | | | | | | | | 0 | 0 | 0 | 1 | S6 | S6 | 0 | 0 | S7 | S7 | S8 | S8 | S8 | | | | | | | |
| 7 | CSMW | 1 | 1 | 1 | 1 | 0 | 0 | | | | | | | | | | | | 0 | 0 | 0 | 1 | S6 | S6 | 0 | 1 | S7 | S7 | S8 | S8 | S8 | | | | | | | |

CHECK BITS: P1, P0, P1, P2, P3

Fig. 3.

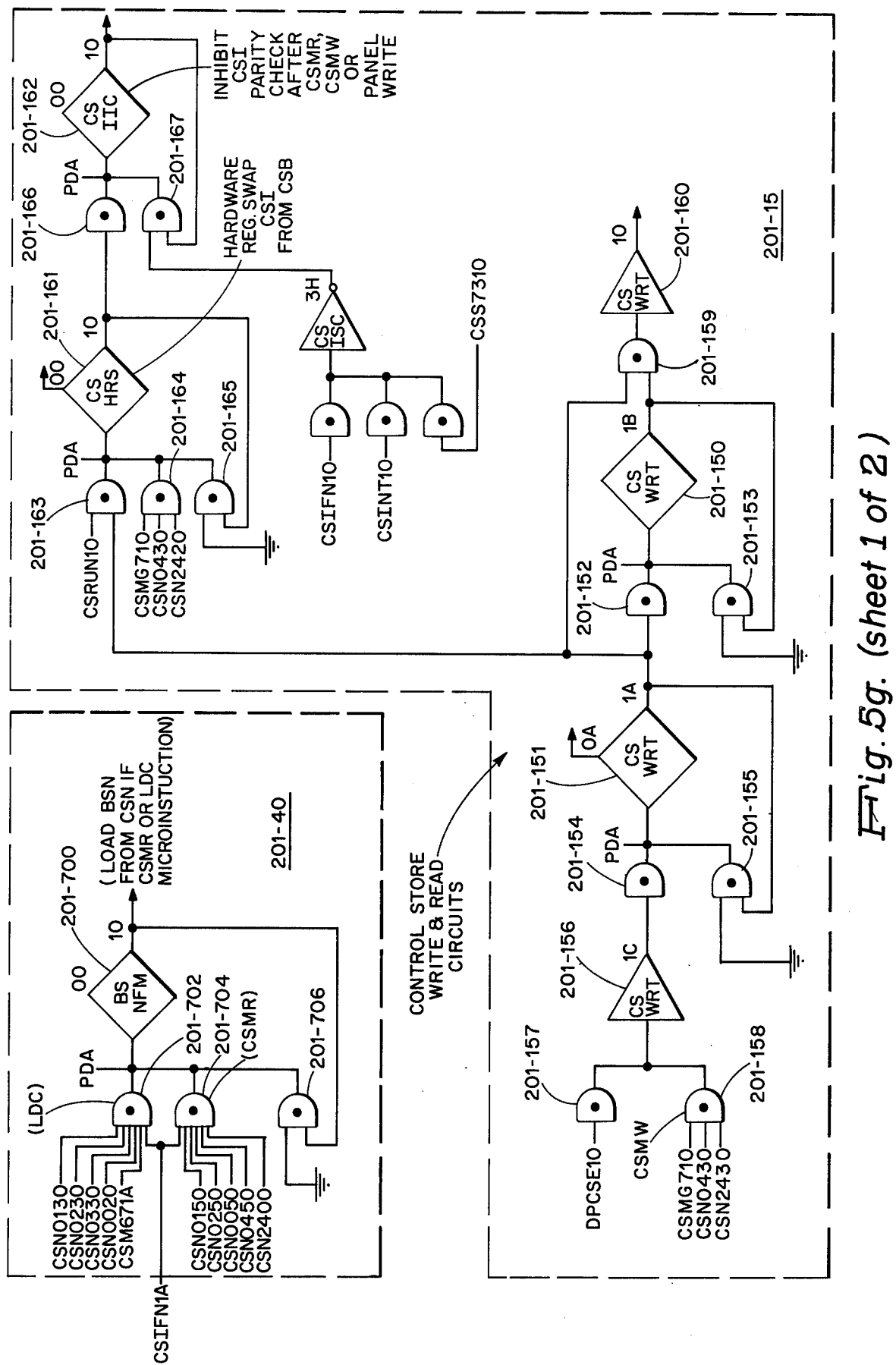
Fig. 5g. (sheet 1 of 2)

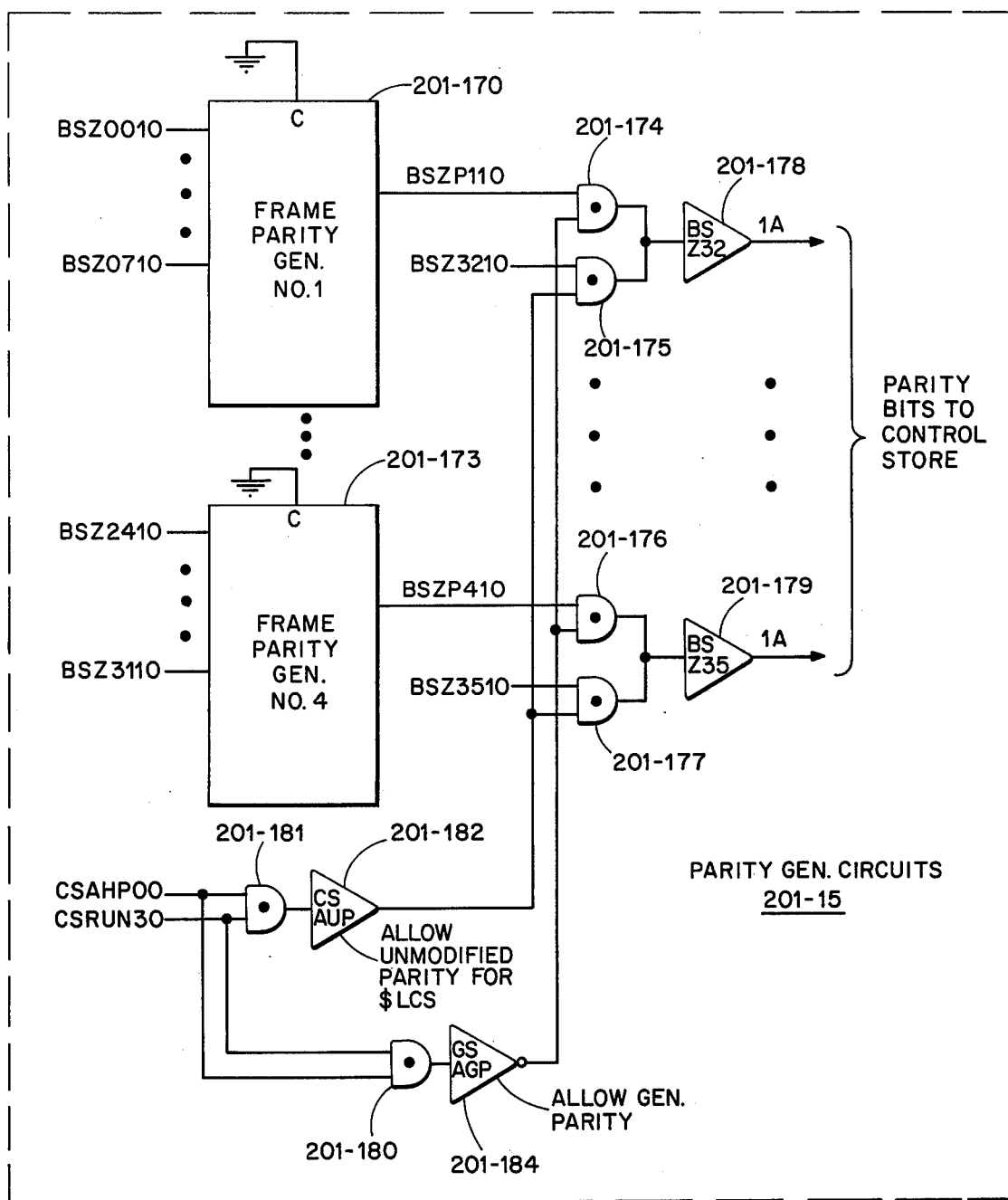
Fig. 5g. (sheet 2 of 2)

CONTROL STORE CHECKING SYSTEM AND METHOD

BACKGROUND OF THE INVENTION

1. Field of Use

This invention relates to checking apparatus for digital storage systems and more particularly to systems for checking the operation of a control store system for controlling the operation of a data processing unit.

2. Prior Art

As well known, both read only control stores and writable control stores have been used for storing microprogramming information. In order to provide the reliable operation of the control store and apparatus associated therewith, various techniques have been employed for diagnosing faults within the control store and associated apparatus. Most of these techniques involve the independent testing of the control store and the associated apparatus. Those techniques which have performed self-diagnosis primarily employ diagnostic programs termed microdiagnostics which are normally incorporated as part of the total maintenance facility for performing basic test operations upon the different portions of the data processing system including the control store.

The type of testing mentioned above is normally manually initiated as a consequence of a system fault. To alleviate the problems of manual testing, one system has provided checking apparatus for verifying the operation of a microprogrammed control store automatically under the control of the microinstructions included in the control store. This type of system is disclosed in U.S. Pat. No. 3,831,148, invented by Thomas O. Holtey et al, which is assigned to the assignee of the present invention. In the case of this checking operation, parity check circuits associated with the diagnostic logic circuit perform a check upon the combination of the information pattern of each microinstruction read to the control store output register and the contents of the control store address register which verifies the correctness of the information and whether this system is being addressed properly.

Another prior art system self-checks a digital storage system for detecting faults therein. This system is disclosed in U.S. Pat. No. 3,789,204, invented by George J. Barlow, and is assigned to the same assignee as named herein. The system combines an address word for a memory location into which information is to be written with a data word that is contained in that address location and generates a parity bit for the combined words and places same into memory. When the information is accessed, the address information is subtracted from the data information to indicate the correct data information if the data parity corresponds to the original data parity.

While both systems provide for automatic detection of faults within a storage system, they do not provide for automatic checking of the associated addressing and control circuits. The operation of such circuits must be independently verified as operating properly. Further, normally, these circuits as well as the control store are checked as part of a test or diagnostic routine prior to normal system operation.

Therefore, it is a primary object of the present invention to provide apparatus for verifying the operation of a control unit.

It is a further object of the present invention to provide appratus for detecing faults within a control unit during both normal and test operations.

It is a more specific object of the present invention to provide apparatus for detecting faults occurring within the control store and the circuits associated therewith.

SUMMARY OF THE INVENTION

The above and other objects of the present invention are achieved in a preferred embodiment of the control store of the present invention which includes a control store having a plurality of addressable locations, a plurality of registers and at least one incrementing circuit. In accordance with the present invention, parity circuits individually connect to each of the registers controlling address operations. These circuits are enabled for checking parity throughout the system operation. Accordingly, when the system is initialized, these registers are set to store good parity. During the assembling of the information to be stored in the control store, odd parity is calculated for the number of ONE bits in the address of the word located one location forward of the current address. This next address parity bit is inserted into a predetermined bit position of the word to be stored in the current address location.

During operation, when the information is accesed from a given storage location, the contents of the register used to address the control store are incremented by one and stored as required. Concurrently, the parity check circuits connected to the registers check the firmware supplied next address parity bit and system supplied incremented address for odd parity. Any parity check circuit detecting an error causes a halt in system operation.

Thus, the present arrangement is able to verify the operation of the control store, the registers and incrementing circuit. Also, the present arrangement eliminates the need for requiring the generation of a new parity check bit for the incremented address contents. Thus, verification of the control store system can proceed rapidly. In the preferred embodiment such checking proceeds at the clocking rate of the system.

The above and other objects of the present invention are achieved in the preferred embodiment described hereinafter. The novel features which are believed to be characteristic of the present invention, both as to its organization and method of operation, together with further objects and advantages thereof, will be better understood from the following description when considered with the accompanying drawings. It is to be expressly understood, however, that each of the drawings is for the purpose of illustration and description only and is not intended as a definition of the limits of the present invention.

BRIEF DESCRIPTION OF THE DRAWINGS

FIG. 2 shows in greater detail the processor interface adapter 200 of FIG. 1.

FIG. 3 shows the different microinstruction formats executed by the adapter 200.

FIGS. 5a through 5i show in greater detail different ones of the blocks of FIG. 2.

GENERAL DESCRIPTION OF THE HOST SYSTEM OF FIG. 1

Figure 1:
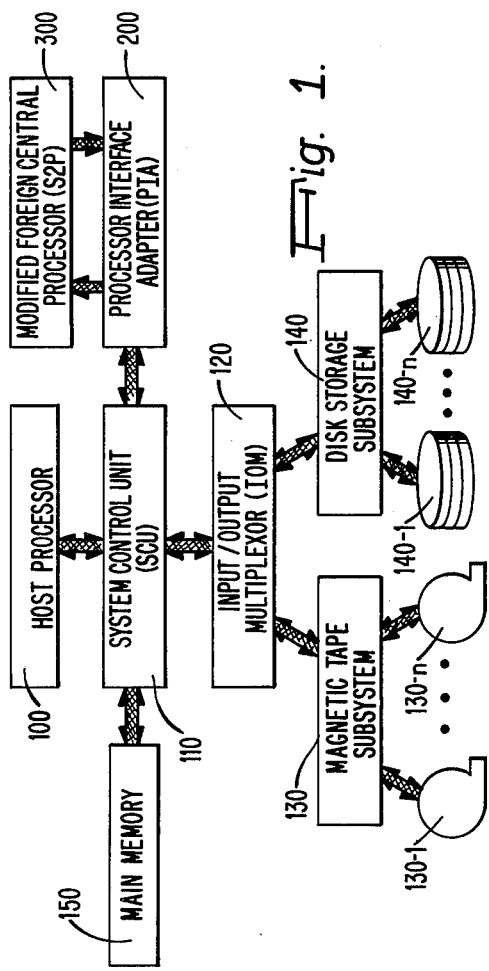
FIG. 1 shows in block diagram form a system which incorporates the principles of the present invention.

FIG. 1 illustrates a data processing system which includes the method and apparatus of the present invention. Referring to the figure, it is seen that the system includes a host processor 100 which couples to a system control unit (SCU) 110 which enables different units within the system to access any one of a number of memory modules included within main memory 150. In addition to coupling to a number of different ports of main memory 150, the system control unit also couples to a number of ports of an I/O controller or multiplexer (IOM) 120 which controls the operation of a number of input/output devices by means of subsystems 130 and 140, as shown in FIG. 1. The subsystem 130 controls a pluralty of tape drives 130-1 through 130-n. The subsystem 140 controls a plurality of disk devices 140-1 through 140-n.

For the purposes of the present invention, the units 100 through 150 may take the form of the systems disclosed in U.S. Pat. No. 3,413,613, and U.S. Pat. No. 3,514,772. The management control subsystem or operating system software for supervising and managing the operating of the data processing system referenced above in the preferred embodiment may take the form of the system described in U.S. Pat. No. 3,618,045.

It will be noted from FIG. 1 that the system includes a central processor (S2P) 300 which couples to a processor interface adapter (PIA) 200. The processor 300 may, for the purposes of the present invention, be considered conventional in design. For example, it may take the form of the processing unit described in a publication "Model 3200 Summary Description" published by Honeywell Inc., copyrighted 1970, order number 111.0015.000.1-C52. Additonally, reference may also be made to U.S. Pat. No. 3,323,110, invented by Lewis G. Oliari et al, and U.S. Pat. No. 3,811,114, invented by Richard A. Lemay et al, both of which are assigned to the assignee of the present invention.

The processor interface adapter 200 is a microprogrammed processor which serves as a data and control interface between the foreign central processor 300 and the host system, enabling the system to emulate target system programs. The adapter 200 directly connects to one of the ports of the system control unit 100 such that no "hardware" modifications to the overall system are required. In carrying out the many operations necessary to enable the processor 300 to execute directly certain types of instructions of a target system program, the adapter 200 is required to perform a number of different operations. The adapter 200 makes use of the present invention in order to increase reliability and reduce the compexity of the checking circuits of the microprogrammed processing unit.

General Description of Processor Interface Adapter 200

FIG. 2 illustrates in block diagram form the processor interface adapter 200. Referring to the figure, it is seen that the adapter 200 includes a control section 201 and an input/output processing section 210.

The control section 201, the most pertinent section to the present invention, provides subcommand signals for controlling the operation of the processor 300 in response to commands received from host processor 100. More specifically, this section generates subcommand signals which control the processor 300, transfer data to and from main memory 150, and control a control panel utilized by processor 300.

The input/output processing section 210 includes the interface circuits which couple the adapter 200 to the SCU 110, the control panel, and data lines of the processor 300. This section performs the various data manipulation operations, and memory addressing operations which take place either under the control of the control section 201 or under the control of processor 300. These two main sections will now be discussed in greater detail.

Control Section

Referring to FIG. 2, it is seen that this section includes a control store 201-10 which is organized to have a maximum of 5120 words, each word containing 36 bits. The control store organization is showed diagrammatically in FIG. 4. As seen from the figure, the lower 1024 locations designated by octal addresses 00000 through 01777 include four read only memory (ROM) circuit boards, each nine bits in width. These storage locations store a number of basic hardware logic test (BLT) microprograms which are used to perform preliminary testing of the adapter circuits and control section, to gain access to main memory 115, and to load the other sections of control store 110 with verification routines and "personality" (normal operating) microprograms or firmware.

Figure 4:
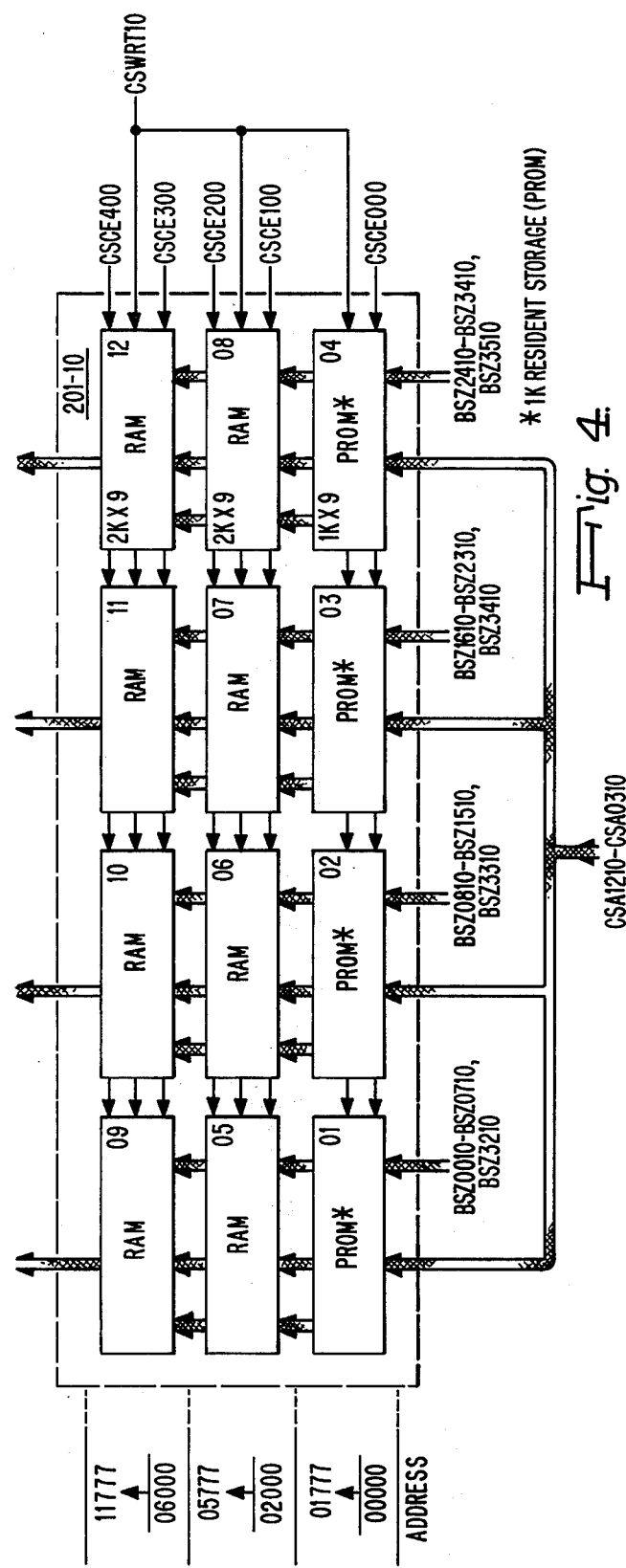
FIG. 4 shows the organization of the control store 210-10 of FIG. 2.

As seen from FIG. 4, the remaining storage locations designated by octal addresses 02000 through 11777 comprise up to two sections of writable storage locations (RAM). These locations store the verification routine "overlays" and personality firmware loaded by a microprogram loader routine also stored in the read only memory section of control store 201-10. To minimize the amount of storage locations required, the vertification routines are divided into a number of different load and execute sequences which are overlayed with one another until, finally, the personality firmware is loaded into control store 210-10. Form the purposes of the present invention, the control store is constructed utilizing conventional circuits which may include circuits of the type disclosed in the publication "The Integrated Circuits Catalog for Design Engineers", published by Texas Instruments, Inc., dated 1972.

As seen in FIG. 4, the complement or negation of the signals CSA0300 - CSA1200 from a memory address register (CSA) 201-12 is applied to each of the ROM circuit packages since each package includes a buffer inverter circuit in series with each address line which inverts the input address signal. Both the assertions and negations of the address signals from register 201-12 are used as inputs to the RAM chips.

The signals CSCE000 through CSCE400 are chip enable signals which are generated in response to decoding the high order address bits of CSA register 201-12 (i.e., bits 00-02). When generated, these signals condition the appropriate ROM or RAM package, enabling access to one of the storage locations of the control store 201-10. A write pulse CSWRT10 is also applied as an input to each chip enabling the signals applied to BSZ0010 through BSZ3510 to be written into a selected storage location. It will be noted that FIG. 4 shows the CSWRT10 signal also being applied to the ROM chip blocks which allows for installation of RAM packages in place of ROM packages for maintenance purposes, when necessary. For further information as to the type of circuits used to provide the enabling signals, reference may be made to U.S. Pat. No. 3,911,406, which is assigned to the same assignee as named herein.

The contents of an accessed storage location are read out via an input bus to a plurality of amplifier circuits of block 201-14. These circuits provide early data output signals CSN0030 through CSN3530 which represent valid signals 139 nanoseconds after the occurrence of a clock pulse. A four megahertz system clock, not shown, generates the clock pulses or PDA pulses which establish the basic timing for the system. For the purposes of the present invention, the clock may be considered conventional in design.

Figure 5A:
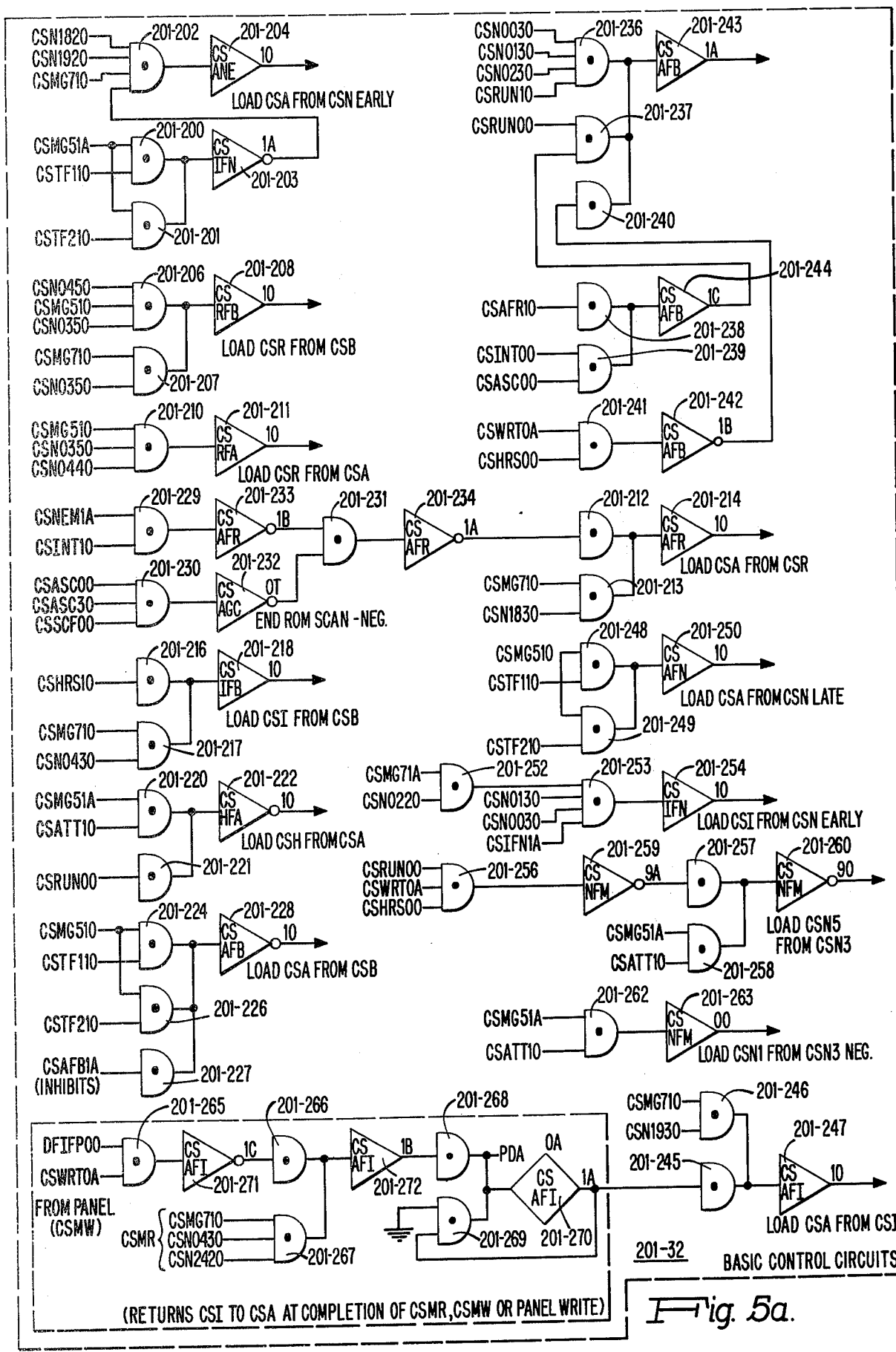

All early register transfer subcommand signals are decoded by circuits included in block 201-32, shown in detail in FIG. 5a, from the signals appearing as outputs from block 201-14. The output signals CSN0030 through CSN3530 are transferred to a 36 bit local memory register corresponding to the latch circuits of block 201-16 in response to a subcommand signal CSNFM00 which is generated by circuits included in block 301-32. Additionally, the output signals CSN0030 through CSN0430 are transferred to a five bit position op code register 201-30 in response to a subcommand signal CSNFM90 generated by the circuits of block 201-32. As explained herein, with reference to FIG. 5a, signal CSNFM90 is normally a binary ONE except when a conditional branch and a no execute condition is present preventing execution of the next microinstruction, or when the system is placed in a STOP mode or during execution of a read or write type microinstruction.

The register 201-30 always stores the op code of the current microinstruction being executed. Thus, bit signals CSN0050 - CSN0450 are derived from CSN0010 - CSN0410.

The register 201-16 always stores the contents of the control store location addressed by the address contained in CSA register 201-12 during the previous clock cycle. The output signals from local register 201-16 are applied to a plurality of decoder circuits of blocks 201-34, 201-36, 201-38, and 201-40 for decoding of all subcommands, data delivery and multiplier control signals, test fields, etc. The output signals from op code register 201-30 are applied to decoder circuits included in block 201-34 which generate major group decode signals and subcommand inhibit signals for inhibiting certain transfer operations, as explained herein.

As seen from FIG. 2, the circuits of block 201-34 receive signals from a block 201-50 which includes a number of state flip-flops for establishing a number of different modes of operation for adapter 200. Each state flip-flop is set or reset by subcommand signals generated by the circuits of block 201-32 or from bits within the mircoinstructions themselves. The output signals from different state flip-flops are applied as inputs to the control panel circuits of block 201-55. These circuits generate signals on a control interface for controlling the operation of S2P processor 300 via the control panel interface logic circuits normally included as part of the S2P processor 300. For example, these circuits enable the enter/display of the S2P processor program/interrupt counters included in its control memory, the operation of the S2P processor in a single instruct, RUN and STOP modes, the clearing and initialization of the S2P processor, and the changing of the address mode and sense switch settings of the S2P processor.

The circuits also supply signals to a maintenance/-control panel which provides for all external operator or maintenance facilities necessary to control system operation.

The operation of these circuits will be described only to the extent necessary for a complete understanding of the present invention. However, for information regarding the type of operations mentioned, reference may be made to U.S. Pat. No. 3,909,802, and U.S. Pat. No. 3,813,531, both of which are assigned to the same assignee as named herein.

It will be noted from FIG. 2 that the early data output signals are also supplied as inputs to the circuits of block 201-15, to CSA register 201-12, and to a control store interrupt (CSI) register 201-26. The output signals condition write control circuits of block 201-15, shown in detail in FIG. 5g, to generate a write pulse signal CSWRT10. In response to certain types of microinstructions, as explained herein, the circuits of block 201-32 force corresponding ones of the subcommand signals CSNAE10 and CSIFN10 to binary ONES which in turn load CSA register 201-12 and CSI register 201-26, respectively, with bit signals CSN05 - CSN17 and CSN23 via transfer paths 201-29 and 201-27. It will also be noted that CSA register 201-12 can also be loaded via a path 201-31 with a branch address and parity check bit from memory local register 201-16 when subcommand signal CSAFN10 is forced to a binary ONE by the circuits of block 201-32, as explained herein.

Considering the control address registers and circuits of section 201-10, it is seen that the CSA register 201-22 serves as a control store memory address register. It is a 14 bit register which stores a 13 bit address generated by the circuits of section 201 and a single parity check bit which, in accordance with the present invention, is previously generated during the assembling of the microinstructions of the microprograms subsequently loaded into control store 201-10. As shown, bit positions 0-12 store the 13 bit address and bit position 13 stores the parity check bit. Register bit positions 0-12 supply a 13 bit address via a path 201-21 for adddressing any one of the 5120 word storage locations of control store 201-10. The parity check bit signal is supplied via line 201-11 to bit position 13 of register 201-12 by the output signal from bit 31 of each microinstruction word read out to the amplifier circuits of block 201-14, as explained herein in greater detail.

The 13 bit address and parity check bit contents of CSA register 201-12 are applied as inputs to a 14 bit position control store return address (CSR) register 201-22 via a transfer path 201-17 and to a 14 bit position control store history (CSH) register 201-18 via a transfer path 201-19. The address and parity check signals are stored in CSR register 201-22 and in CSH register 201-18 when corresponding ones of the subcommand signals CSRFA10 and CSHFA10 are forced to binary ONES by the circuits of block 201-32.

The CSR register 201-22 is used to store a return address for microprogram subroutine returns. As explained herein, this register is loaded with a return address in response to branch type and return type microinstructions. The stored address is applied to CSA register 201-12 via a path 201-37. The address and parity check signals are loaded into CSR register 201-12 when the circuits of block 201-32 force a transfer signal C CSAFR10 to a binary ONE. The CSH register 201-18 is used for displaying the previous contents of CSA register 201-12. This register is loaded automatically by control circuits and is not accessible with microinstructions.

Additionally, the 13 bit address from CSA register 201-12 is also applied as an input to a 13 bit adder circuit (CSB) 201-20 which automatically increments the address by one. For the purpose of the present invention, the adder circuit 201-20 can be considered conventional in design. The incremented address is applied to the high order 13 bit positions of CSR register 201-22 via a transfer path 201-23 and to the high order 13 bit positions of CSI register 201-25 via a transfer path 201-25. Similarly, the parity check bit signal on line 201-11 is applied via the aforementioned transfer paths to the least significant bit position of CSR register 201-22 and CSI register 201-26. The address and parity check signals are stored in CSR register 201-22 and CSI register 201-26, respectively, when corresponding ones of the subcommand signals CSRFB10 and CSIFB10 are forced to binary ONE by the circuits of block 201-32. The CSI register 201-26 is used as a second return address register and as an address/work register during control store read and write operations. The register is loaded via path 201-27 when subcommand signal CSIFN10 is forced to a binary ONE by the circuits of block 201-32.

Both the incremented address from the adder circuit 201-20 and the parity check signal on line 201-11 are applied as inputs to CSA register 201-12 via a transfer path 201-33. The address and parity check signals are stored in CSA register 201-12 when a subcommand signal CSAFB10 is forced to a binary ONE by the circuits of block 201-32.

As seen from FIG. 2, the output signals from CSI register 201-26 are applied to one input via a path 201-39 of a two input data selector multiplexer circuit 201-24. The circuit 201-24 has its other input connected to receive an address from a control panel. In response to signals DPSAA-C, the selected output signals of circuit 201-24 are, in turn, applied to CSA register 201-12 via a path 201-35. During normal operation, the CSI register 201-26 is selected as the source of address signals. The address and parity check signals are loaded into CSR register 201-12 when a transfer subcommand signal CSAFI10 is forced to a binary ONE by the circuits of block 201-32.

It will be noted that each of the microprogram accessible address registers CSA, CSR, and CSI connects to a parity check circuit (i.e., circuits 201-42, 201-43, and 201-44). Each of these circuits is always enabled and is operative to check the register associated therewith for good parity as explained herein. The output signal generated by each parity check circuit is applied as an input to error circuits, included in a block 201-45, which cause a halt in system operation upon the occurrence of an error signal indicative of a fault within control section 201.

The last components of control section 201 are a 24 bit tally counter 201-56 and an associated 24 bit increment/decrement circuit 201-58, connected as shown. The tally counter 201-56 is an up-down counter which is operated under microprogram and hardware control. A count to be loaded into the counter 201-56 and count direction can be specified by certain types of microinstructions. The counter 201-56 includes a pair of flip-flops (overflow and underflow) for indicating the detection of the occurrence of a boundary crossing relative to the last control microinstruction having been issued. The counter 201-56 is loaded from input lines BSZ48 - BSZ71 in response to a subcommand signal CSS8610. At the same time, both boundary detection flip-flops are reset to ZEROS.

The mode of operation of the increment/decrement circuit 201-58 is defined by the state of one of the flip-flops of block 201-50. When the flip-flop is a binary ONE and a binary ZERO, the circuit 201-58 is conditioned to decrement and increment, respectively, the contents of counter 201-56. When signal CSMTC10 is forced to a binary ONE in response to a microinstruction, the incremented or decremented value is loaded into counter 201-56 and the overflow and underflow flip-flops are strobed. In the increment mode, the overflow flip-flop is switched to a binary ONE only when the count switches from 77777777 to all ZEROS. Similarly, in the decrement mode, the underflow flip-flop is switched to a binary ONE only when the count switches from an all ZERO count to 77777777.

Input/Output Processing Section 210

As seen from FIG. 2, this section includes an input multiplexer circuit 210-10, a data section 210-6, an address section 210-2, an SCU memory interface section 210-4, and an S2P interface section 210-8, connected as shown. The 36 bit multiplexer (data selector) circuit 210-10 receives input signals from the data sources shown (i.e., control store 201-10, memory interface section 210-4, etc.) and applies the signals from the selected source to both section 210-2 and section 210-6. It is the states of signals P1, P2, and P3 defined by certain microinstruction fields or by the decoding of microinstructions by the circuits of block 201-40 or by other circuits as explained herein which designate the source to be selected. In a similar fashion, the states of the groups of signals P5, D6, MG2, and D5, D6, MG3 generated in response to certain microinstruction fields and the circuits of block 201-34 designated section 210-2 and section 210-10, respectively, as the receiver of the set of signals from multiplexer circuit 210-10.

Figure 5B:
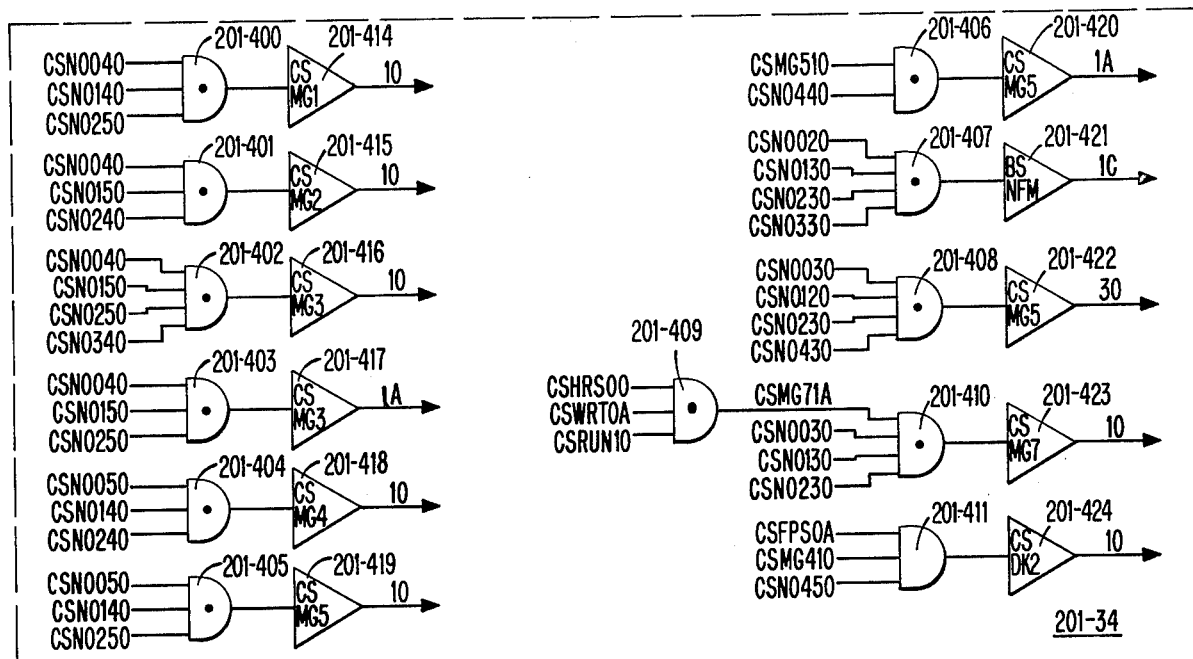
Figure 5E:
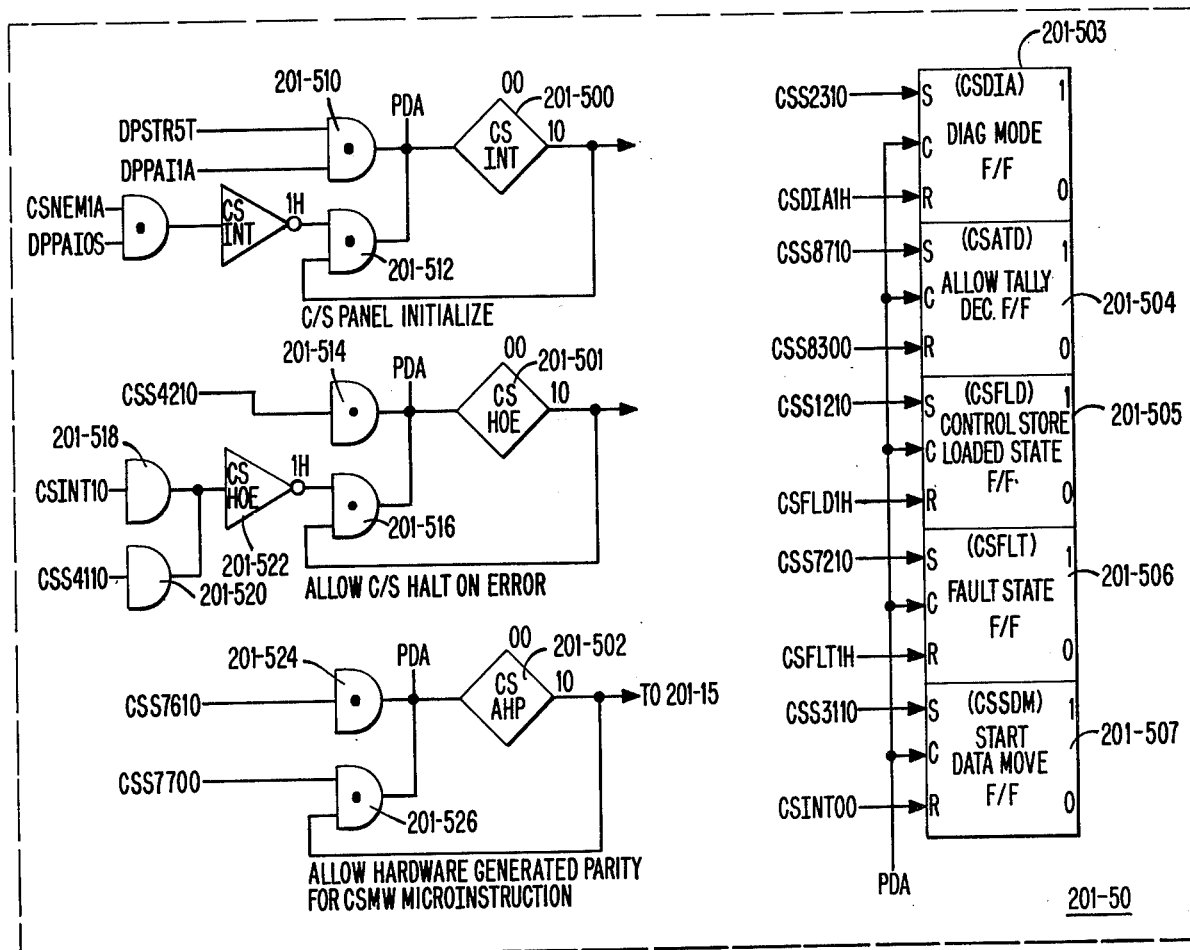
Figure 5C:
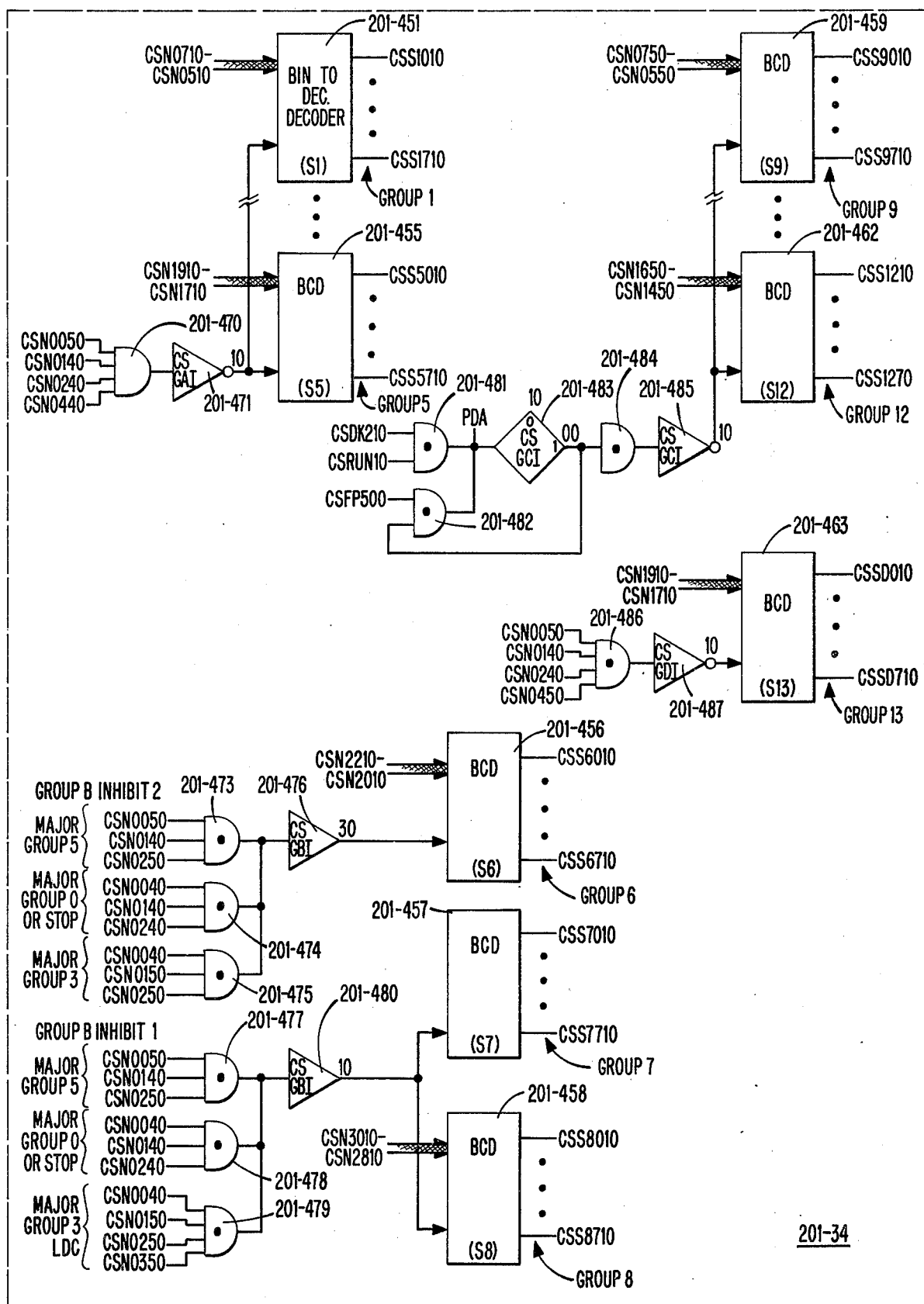
Figure 5D:
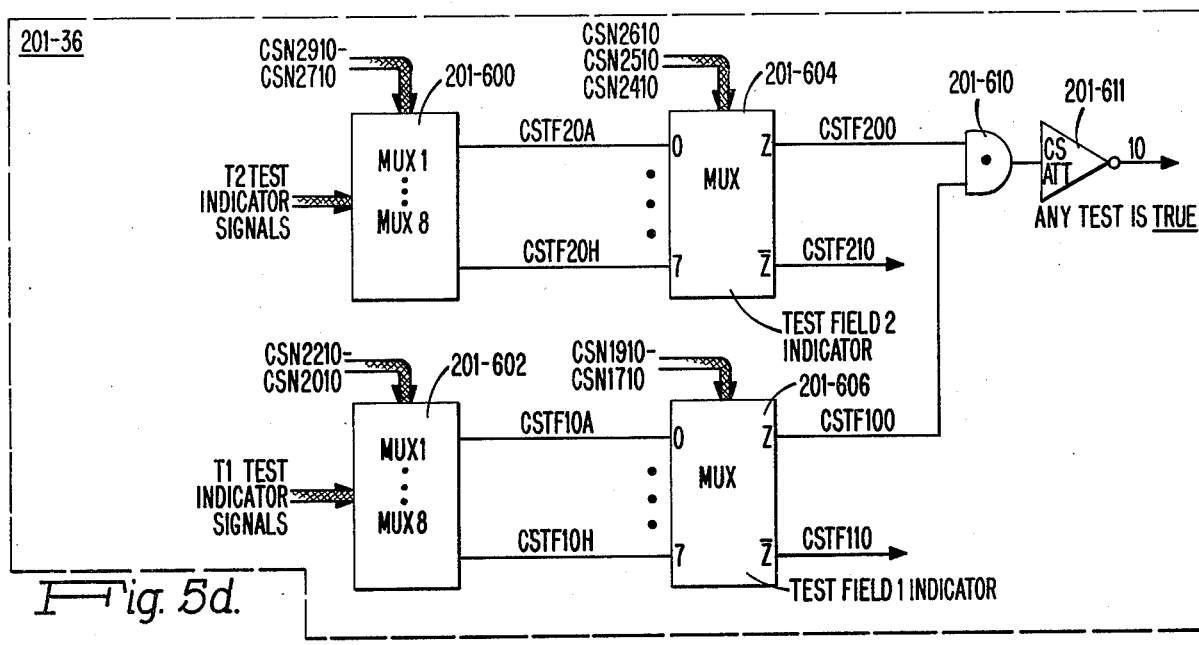
Figure 5H:
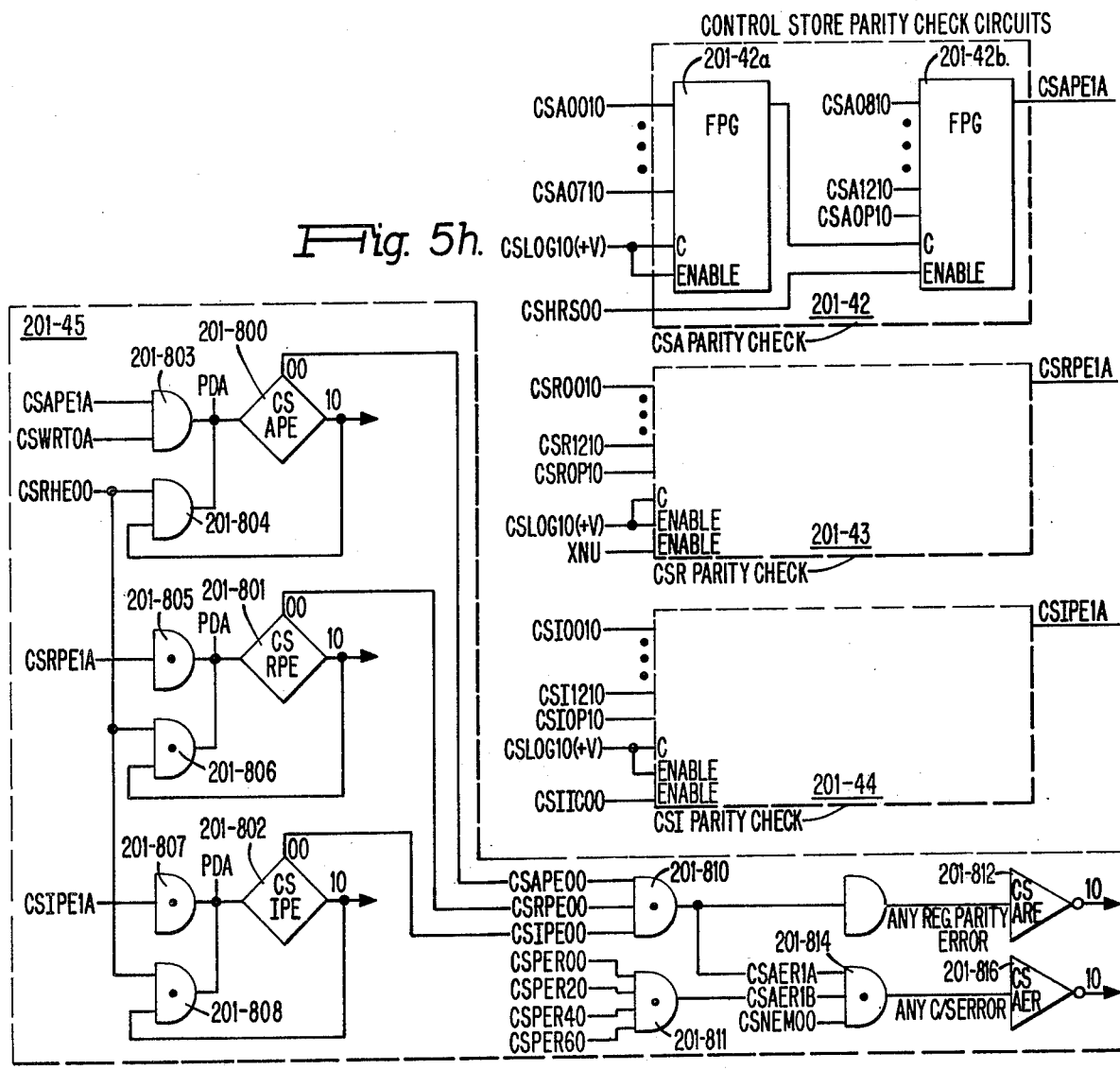
Figure 5F:
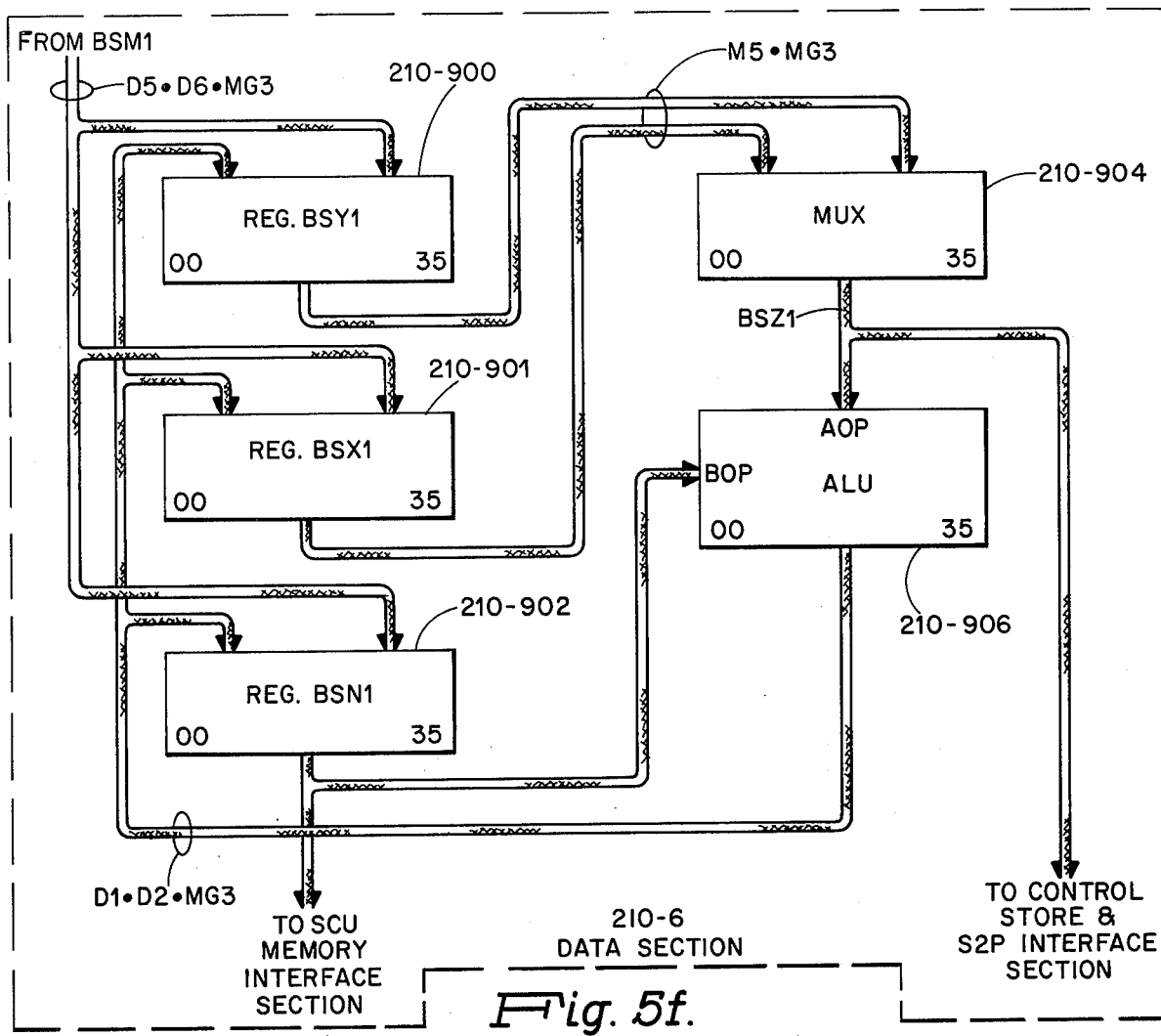

The data section 210-6, shown in greater detail in FIG. 5f, provides the adapter 200 and S2P processor 300 with a communication path to the SCU 110. The section 210-6 performs the necessary data manipulation operations for transferring data bytes and ensuring proper data byte alignment. Data transfers within the adapter 200 can be controlled by microprogram or by hardware sequences. Unless a microprogram releases control to a group of hardware control circuits which can be considered as part of block 210-6, the manipulation of registers and multiplexer circuits proceeds under direct control of the microprogram. When certain microinstructions are executed such as for starting a data transfer operation for releasing control, the hardware control circuits control the transfer until it is completed.

From this it can be seen that the subcommand signals (i.e., P1, P2, P3 or D5, D6, MG3, etc.) which cause the transfer of data signals are generated by logic gate circuits having at least two sets of inputs. One set includes a signal indicating that the hardware control circuits are to control the transfer, signals from a cycle counter included as part of the hardware control circuits and signals representative of system conditions.

The other set includes the complement of the signal indicating that the transfer is to proceed under microprogram control, a signal designating a particular type of microinstruction and signals corresponding to a bit or bits within the particular microinstruction. For an example of the type of circuits which could be used to generate such hardware sequences, reference may be made to U.S. Pat. No. 3,909,799, which is assigned to the same assignee as named therein.

The address control section 210-2 performs operations for addressing main memory 150 during read and write operations. The section also performs the required address checking operations related to memory protection and base relocation operations. As explained herein, this section is organized in a fashion similar to data section 210-6.

The memory interface section 210-4 includes registers and circuits for connecting the adapter 200 to the lines which comprise the system port interface of the SCU 110. These lines include up to 74 bidirectional data and parity lines, 24 address lines, five command lines, and a number of control lines including lines for transmitting initialize, transmit, interrupt, ready, and connect signals between the adapter 200 and SCU 110.

The S2P interface section also includes registers and circuits for connecting the adapter 200 to the memory interface lines of the processor 300. These lines include two sets of 19 memory address lines, 36 data lines (18 in and 18 out) and a number of control lines (to perform S2P clock stalls, S2P relocation, write masking).

The section 210-8 includes data selection circuits for aligning and transferring characters at a rate compatible with the memory interface requirements of processor 300. More specifically, in the preferred embodiment, the S2P processor 300 is a two character processor which, during normal operation, extracts two data characters from its main memory during a one microsecond cycle of operation. The two data/address buses provide an interface with two asynchronous one byte wide registers connected to a "crossbar" bus switching network. The arrangement enables the processor 300 to manipulate two characters at a time (reading or writing) in a manner which is identical to its normal operating environment.

MICROINSTRUCTION FORMATS

Before describing in greater detail the different blocks of FIG. 2, the different types of microinstructions and their formats will be described with reference to FIG. 3.

Referring to FIG. 3, it will be noted that the adapter 200 is capable of executing the operations specified by the op codes of up to 25 different microinstructions which are organized into eight major groups. Each microinstruction word contains all the operands required for a given operation.

The eight major groups and the types of operations designated are:
Group 0: no-op —no operation
Group 1: MMRQ —main memory (SCU) request parameter and control operation
Group 2:
　ARCA —address register arithmetic and control operation
　ARCL —address register logic and control operation
Group 3:
　DRCA —data register arithmetic and control operation
　DRCL —data register logic and control operation
　LDC —load constant to BSN1 register operation
Group 4:
　DCK1 —direct control 1 operation
　DCK2 —direct control 2 operation
Group 5:
　CBOTN —conditional branch on test and no execute operation
　CBOTE —conditional branch on test and execute operation
　CBRTN —conditonal branch on test and load return register and no execute operation
　CBRTE —conditional branch on test and load return register and execute operation
Group 6: LCSIK —load control store interrupt register and control operation
Group 7:
　UCBK —unconditional branch and control operation
　UBRK —unconditional branch and control and load return register operation
　RTNFI —return from interrupt register and control operation
　RTFIR —return from interrupt register and control and load return register
　RTNFR —return from return register and control operation
　RTFRR —return from return register and control and load return register operation
　CSMR —control store memory read operation
　CSWR —control store memory write operation From FIG. 3, it is seen that each microinstruction includes a five bit op code (i.e., bits 0–4) for specifying the type of operation to be performed. Additionally, each microinstruction has 26 bits (bits 5–30) coded to specify subcommands, constants, addresses, etc., and five parity check bits (i.e., bits 31–35). Each of parity bits 32–35 is associated with a different byte of the microinstruction word. That is, bit 32 represents odd parity for bits 0–7, bit 33 represents odd parity for bits 8–15, bit 34 represents odd parity for bits 16–23, and bit 35 represents odd parity for bits 24–30. Bit 31 is a special parity check bit which, in accordance with the present invention, represents odd parity for the next sequential absolute memory address to be accessed. As explained herein, the value for bit 31 is established during the assembling of the microinstructions prior to their being stored in control store 210-10.

The different microinstructions of FIG. 4 will now be discussed in greater detail. The single group 0 microinstruction has an all ZERO op code which specifies no operation. The sngle group 1 microinstruction has an op code of 00100 and this microinstruction sets up paramenters for main memory (SCU) cycles. Bits 5–9 are coded to specify the type memory command, bits 10–13 are coded to specify a zone. Bits 14, 15 and 16 are coded to specify relocation, paging, and limiting check modes, respectively. Bits 20–22, 25–27, and 28–30 are coded to specify subcommand groups 6, 7, and 8, respectively.

The first group 2 microinstruction, ARGA, has a 01000 op code. This microinstruction conditions the address control section 210-2 to perform arithmetic operations on the addresses stored in section registers required for main memory (SCU) addressing. Bits 5–10 are coded to define the type of arithmetic operation (mode) to be performed by an arithmetic and logic unit (ALU) included in section 210-2 (bit 10 is a Carry In bit). Bits 15-17 are coded to select the desired port (source) on multiplexer circuit 210-10. The pairs of bits 11-12 and 18-19 are coded to specify which register in the first and second groups of registers is to receive the ALU result output signals. The bit pair 23-24 is coded to specify which register of the first group is to receive the output signals from multiplexer circuit 210-10. Bits 20-22, 23-24, and 25-26 are coded to specify subcommand groups 6, 7, and 8, respectively.

The second group 2 microinstruction, ARCL, has a 01001 op code. The microinstruction is coded the same as the ARCA microinstruction with the exception that bits 5-10 are coded to define the type of logical operation to be performed by the section's ALU. Since it is a logical operation, there is no Carry In signal and bit 10 is a ZERO.

The first and second group 3 microinstructions are coded similar to the microinstructions of group 2. The first group 3 microinstruction, DRCA, has a 01100 op code. This microinstruction conditions the data section 210-6 for performing arithmetic operations upon the data contents of the different registers included in the section. As explained herein, operations can be performed separately or simultaneously upon the upper 36 bits (00-35) or lower 36 bits (36-71) of each register. Bits 5-10 define the type of arithmetic operation which is to be performed by the arithmetic and logic units (ALU's) of the section. Bits 15-17 are coded to select the port (source) of bits 0-35 from multiplexer circuit 210-10 and bits 20-22 similarly select the port (source) of bits 36-71 from a second multiplexer circuit, not shown. The pairs of bits 10-11 and 13-14 are coded to define which one of the registers within the first and second groups of registers is to receive result output signals from the section's ALU's. The pairs of bits 18-19 and 23-24 are coded to define which one of the registers within the first and second groups of registers is to receive output signals from the multiplexer circuit 210-10 and the second multiplexer, not shown. Again, bits 25-27 and 28-30, respectively, are coded to specify group 7 and 8 subcommands.

The second group 3 microinstruction, DRCL, has a 01101 op code. This microinstruction is coded the same as the DRCA microinstruction with the exception of mode bits 5-10 which are coded to define the type of logical operation to be performed by the section's ALU's.

The last group 3 microinstruction has a 01110 op code. This microinstruction causes a 26 bit constant (bits 5-30) to be delivered to a specific register (BSN1) within section 210-6 via the multiplexer circuit 210-10.

The first and second group 4 microinstructions DCK1 and DCK2 have op codes of 10000 and 10001, respectively. The first group 4 microinstruction has groups of bits coded to specify operations defined by subcommand groups 1-8. The DCK2 microinstruction has groups of bits coded to specify operations defined by subcommand groups 6-13 as indicated.

The group 5 microinstructions are conditional branch microinstructions used to examine the states of various test indicator circuits within the adapter 200 and branch to a location within the control store 201-10 specified by address bits 5-16 when the results of the test are true according to a specified convention. The bits 17-22 and 24-29, respectively, are coded to specify the two test indicator circuits whose states are to be examined. It will be noted that the low order branch address bit (A12) is not specified in the microinstruction. Bit 23 is an odd parity bit calculated for address bits 5-16 during the assembling of the microinstructions before being stored in control store 201-10. The bit A12 is assumed to be ZERO for the calculation.

In the branching convention employed, a control store microprogram branches to the branch address location when the state of the indicator specified by test field 1 is not true and the state of the indicator specified by test field 2 is true. Bit 12 of the CSA register 201-12 is set to a binary ZERO. When the indicator state specified by test field 1 is true and the indicator state specified by test field 2 is true or false, the microprogram branches to the branch address location plus one (bit 12 of the CSA is set to a binary ONE). Since bit 23 is an odd parity bit for the branch address when the test field 1 result is true, effective to increment the branch address by one, the state of this bit is complemented or inverted before being stored in CSA register 201-12. This preserves good parity as explained herein.

The type of operations performed by each of the branch type microinstructions will now be discussed. During the execution of each branch microinstruction, if either condition being tested by fields 1 and 2 is true, the control store microprogram branches to the microinstruction specified by the branch address. The different microinstructions provide for the following variations in operations.

The CBOTN microinstruction has an op code of 10100. When executed, it inhibits the execution of the next microinstruction in sequence when the branch condition tested is true. When the condition being tested is not true, the microprogram sequences to the next microinstruction.

The CBOTE microinstruction has an op code of 10101. This microinstruction is executed in the same manner as the CBOTN microinstruction except that the microinstruction immediately following is always executed prior to branching.

The CBRTN microinstruction has an op code of 10110. This microinstruction is also executed in the same manner as the CBOTN microinstruction with the exception that it causes the CSR register 201-22 to be loaded with the address of the location immediately following the branch microinstruction.

The CBRTE microinstruction has an op code of 10111. This microinstruction is executed in the same manner as the CBOTE microinstruction except that it causes the CRS register 201-22 to be loaded with the address of the branch microinstruction plus two (this accounts for the microinstruction executed following the branch).

The single group 6 microinstruction, LCSIK, has a 11010 op code. This microinstruction contains a 13 bit address and an odd parity check bit corresponding to bits 5-17 and bit 23, respectively, which is loaded into CSI register 201-26. Bits 20-22, 25-27, and 28-30, respectively, are coded to specify subcommand groups 6, 7, and 8.

The group 7 microinstructions perform a modification of the CSA register 201-10 contents prior to execution. As seen from FIG. 3, each such microinstruction includes a 13 bit field (i.e., bits 5-17) coded to specify a branch address or all ZEROS. Bit 23 is coded to specify odd parity for the microinstructions containing branch addresses. In certain cases, bits 18-19 and 23-24 are also coded to further define the type of microinstruction. Bits 20-22, 25-27, and 28-30, respectively, are coded to specify subcommand groups 6, 7, and 8.

Considering each microinstruction separately, it is seen that the UCBK microinstruction has a 11100 op code. This microinstruction causes the control store microprogram to branch to the location specified by address bits 5-17. The UBRK microinstruction having a 11110 op code is executed in the same manner as the UCBK microinstruction except that it also causes the CSR register 201-22 to be located with a return address from CSB incrementing circuit 201-20.

The RTNFI microinstruction has an op code of 11100. This microinstruction causes the control store microprogram to return to the program address specified by the contents of the CSI register 201-26. The RTFIR microinstruction has an op code of 11110 and is executed in the same manner as the RTNFI microinstruction except that it also causes the CSR register to be loaded with a return address obtained from CSB incrementing circuit 201-20.

The RTNFR microinstruction has a 11100 op code. This microinstruction causes the control store microprogram to return to the program address specified by the CSR register 201-22. The RTFRR microinstruction with an op code of 11110 is executed in the same manner as the RTNFR microinstruction except that it also causes the CSR register 201-22 to be loaded with a return address obtained from CSB incrementing circuit 201-20.

The CSMR microinstruction has a 11101 op code. This microinstruction causes the contents of the storage location specified by the contents of the CSI register 201-26 to be read from the control store 201-10 and loaded into a predetermined one of the registers of data section 210-6. The CSMW microinstruction with the same op code causes the contents in a predetermined one of the registers of data section 210-6 to be written into the storage location specified by the contents of CSI register 201-26.

DETAILED DESCRIPTION OF FIG. 2 CIRCUITS

The different ones of the blocks of FIG. 2 will now be discussed with reference to FIGS. 5a through 5h.

Basic Control Decode Circuits 201-32

FIG. 5a shows the circuit 201-200 through 201-272 which generate the different register transfer signals for conditioning the various registers of control section 201 for transfers during microinstruction execution.

Referring to the figure, it is seen that a plurality of AND gates 201-200 through 201-202, together with an inverter circuit 201-203 and amplifier circuit 201-204, are operative to generate the early transfer signal CSANE10 in response to certain group 7 microinstructions (i.e., UCBK and UBRK microinstructions). The signal CSIFN1A is forced to a binary ZERO by either a CBOTN or CBRTN microinstruction where the condition specified by test field 1 or test field 2 is true. This inhibits the generation of signal CSANE10 as well as early transfer signal CSIFN10 by an AND gate 201-253.

The AND gates 201-206 and 201-207 cause amplifier circuit 201-206 to force transfer signal CSFB10 to a binary ONE in response to certain group 5 and group 7 microinstructions. These are the CBRTE microinstructions of group 5 and the UBRK, RTFIR, and RTERR microinstructions of group 7.

The AND gate 201-210 causes the amplifier circuit 201-211 to force transfer signal CSRFA10 in response to a CBRTN microinstruction of group 5. The gates 201-212 and 201-213 cause the amplifier circuit 201-214 to force transfer signal CSAFR10 to a binary ONE in response to certain conditions (i.e., the end of a scan operation, CSASCOT = 0, in response to an initialize signal, or a "top of memory" signal during a prescan operation, CSAFRIB = 0) and in response to certain group 7 microinstructions (i.e., RTNFR and RTFRR microinstructions). The gates 201-230 and 201-231 and inverter circuits 201-232 through 201-234 provide the appropriate conditioning signal to gate 201-212, as shown.

The gate 201-216 causes the amplifier circuit 201-218 to force transfer signal CSIFB10 to a binary ONE during a "hardware register swap" operation (i.e., CSHRS10 = 1) in which the CSI register 201-26 is loaded with an incremented address from CSB incrementing circuit 201-20 during the CSMR and CSWR microinstructions. AND gate 201-217 causes the circuit 201-218 to force the CSIFB10 signal to a binary ONE during the fetching phase of CSMR and CSMW microinstructions.

The AND gate 201-220 inhibits the inverter circuit 201-222 from forcing the transfer signal CSHFA10 required for updating history register 201-18 during the execution of CBOTN and CBRTN branch microinstructions when any one of conditions being tested is true (CSATT10 = 1). The gate 201-221 also inhibits signal CSHFA10 from being forced to a binary ONE when the control section 201 is not in the RUN state (i.e., CSRUN00 = 1). The conditions which set the control section to the RUN state are the pressng of a control panel one-instruct button, the panel run button, or the completion of a successful scan operation.

The control section switches from the RUN state to a halt state upon the depression of a panel initialize button, the one instruct button or panel stop button in addition to certain error conditions, etc.

The AND gates 201-224, 201-226, and 201-227 inhibit inverter circuit 201-228 from forcing transfer signal CSAFB10 to a binary ONE in the case of certain types of microinstructions. For example, the AND gates 201-224 and 201-226 inhibit CSAFB10 from being switched to a binary ONE during the execution of group 5 branch microinstructions when either condition tested by test field 1 or test field 2 is true. This prevents the normal (nonbranch) incrementing of the address contents of CSA register 201-12 from the CSB incrementing circuit 201-20. The AND gate 201-241 and gate 201-240 also inhibit CSAFB10 from being switched to a binary ONE during CSMR and CSMW microinstructions. The AND gate 201-237 also inhibit CSAFB10 when the control section 201 is not in the RUN state (i.e., CSRUN00 = 1) and it has not been initialized, is not in the scan mode (CSINT00 = 1, CSASC00 = 1), or signal CSAFR10 is a binary ONE. A last AND gate 201-236 inhibits CSAFB10 from switching to a binary ONE during the fetching phase of group 7 microinstructions.

The gate 201-245 causes amplifier circuit 201-247 to force tranfer signal CSAFI10 to a binary ONE at the completion of a CSMR or CSMW microinstruction or at the completion of a panel write operation via the gates 201-265 through 201-268 which switch flip-flop 210–270 to a binary ONE for one clock pulse interval (reset via AND gate 201–269). In response to RTNFI and RTFIR microinstructions of group 7, the AND gate 201–246 also forces the CSAFI10 signal to a binary ONE.

The pair of AND gates 201–248 and 210–249 causes amplifier circuit 201–250 to force the late transfer signal CSAFN10 to a binary ONE during the execution of group 5 conditional branch microinstructions when the result of either condition being tested by test field 1 or test field 2 is true.

The AND gates 210–252 and 201–253 cause amplifier circuit 201–254 to force the early transfer CSIFN10 signal to a binary ONE during the fetching phase of an LCSIK group 6 microinstruction when signal CSIFN1A is a binary ONE under the condtions discussed above.

The gates 201–256 and 201–257 inhibit the op code transfer signal CSNFM90 from being forced to a binary ONE during the execution of CSMR and CSMW microinstructions of group 7. The gate 201–258 inhibits the CSNFM90 signal during the execution of CBOTN and CBRTN microinstructions of group 5 when the condition being tested by test field 1 or test 2 is true. In a fashion, AND gate 201–262 causes amplifier circuit 201–263 to force transfer signal CSNFM00 to a binary ZERO in response to CBOTN and CBRTN microinstructions when the condition being tested is true.

Major Group and Subcommand Decode Circuits 201–34

The circuits which generate the various group decode signals applied to the circuits of block 201–32 are shown in detail in FIG. 5b. Referring to the figure, it is seen that the major group signals result primarily from decoding different combinations of the op code bits 0–4. The circuits include a plurality of AND gates 201–400 through 201–411 which are operative to condition their respective amplifier circuits 201–414 through 201–424 in response to different op code bit patterns of the different microinstruction types.

FIG. 5c shows the subcommand decoder circuits which are operative to generate the subcommand signals required for microinstruction execution. As seen from the figure, the subcommands are divided into 13 separate groups of seven subcommands. Thus, block 201–34 includes 13 binary to decimal (BCD) decoder circuits 201–451 through 201–463, each of which decodes a specific group of bits from the memory local register 201–16. The high order bit input of each decoder circuit is used as an enable input and receives inhibit signals (i.e., CSGAI10 through CSGDI10 generated by different ones of the circuits 201–470 through 201–487. This means that when an inhibit signal is forced to a binary ONE, this inhibits the decoding of subcommand signals because the output codes now have values higher than those required for generating the seven subcommands.

The inhibit signals labeled groups A through D are specified as follows:

1. CSGAI10 = (group A) for subcommand decoder groups 1–5. It is forced to a binary ZERO only in response to DCK1 microinstructions.
2. CSGBI10 = (group B) for subcommand decoder groups 7–8. It is forced to a binary ZERO in response to all microinstruction groups except group 0, group 5, or LDC microinstructions.
3. CSGBI30 = (group B) for subcommand decoder group 6. It is forced to a binary ZERO in response to all microinstruction groups except groups O, 3, and 5.
4. CSGCI10 = (group C) for subcommand decoder groups 9–12. It is forced to a binary ZERO only in response to DCK2 microinstructions.
5. CSGDI10 = (group D) for subcommand decoder group 13. It is forced to a binary ZERO only in response to DCK2 microinstructions.

Test Indicator and Branch Circuits 201–36

FIG. 5d shows the circuits for decoding the two six bit groups of test field bits included within group 5 microinstructions. As seen from the figure, the circuits include four groups of multiplexer circuits. Two of the groups corresponding to blocks 201–600 and 201–602 each includ eight multiplexer circuits. The other two groups corresponding to blocks 201–604 and 201–606 each include a single multiplexer circuit. Each multiplexer selector circuit has eight inputs, each of which is connected to receive a predetermined indicator signal representative of a particular condition.

The particular condition to be selected by each multiplexer circuit of blocks 201–600 and 201–602 is designated by test field 1 bits CSN20–22 and test field 2 bits CSN27–29. The remaining three bits of each test field are used to select one of the eight outputs from each group of eight multiplexer circuits (i.e., signals CSTF10A-CSTF10H and CSTF20A-CSTF20H), as shown. An AND gate and inverter circuit combine the test field 1 and test field 2 indicator output signals and forces signal CSATT10 to a binary ONE when the condition tested by test field 1 or test field 2 is true.

Major State Circuits 201–50

The major state circuits include a plurality of flip-flops 201–500 through 201–507, a number of which are shown in FIG. 5e. For the purpose of simplicity, only three of the flip-flops are shown with the circuits associated therewith. However, the other flip-flops include similar circuit arrangements.

The flip-flop 201–500 indicates when the control section 201 has been initialized. The AND gate 201–510 switches flip-flop 201–500 to a binary ONE when a control store initialize button is depressed. The AND gate 201–512 resets the flip-flop upon the release of the button and when signal CSNEM1A goes high. The CSINT10 signal is used to reset the CSR and CSI registers 201–22 and 201–26, as explained herein and places the adapter 200 and S2P processor in a known state.

The flip-flop 201–501 allows the control section 201 to halt operation upon the detection of a "hardware" error, a control store memory parity error, a registry parity error Ii.e., the CSA, CSI, and CSR registers), or a non-existent memory check error. The gate 201–514 switches the flip-flop to a binary ONE in response to subcommand signal CSS4210. The flip-flop resets in response to depression of the initialize button or in response to subcommand signal CSS4110. When reset, the flip-flop 201–501 does not cause a halt in system operation in response to control store errors. The errors just cause the setting of appropriate status indicators. It will be appreciated that the mode of operation enabled by flip-flop 201–501 finds advantage when the system is conditioned to execute basic logic test and maintenance verification routines for testing checking circuit operation.

The next flip-flop 201–502 allows selection of either unmodified 36 bits for writing into the control store 201–10 (i.e., when signal CSAHP10 = 0) or parity check bits generated by circuits of block 201–15 for writing into the control store 201–10 (i.e., when signal CSAHP10 = 1). The flip-flop 201–502 is switched to a binary ONE subcommand signal CSS7610 via gate 201–524. It is reset by subcommand signal CSS7700 via AND gate 201–526.

The flip-flop 201–503 is a diagnostic mode used during the execution of maintenance verification routines as a status indicator. It is switched to a binary ONE by subcommand signal CSS2310 and reset to a binary ZERO to hold signal CSDIA1H. The flip-flop 201–504 defines the mode of the CST tally counter 201–54. When set to a binary ONE by subcommand signal CSS8710, the flip-flop indicates that the counter is in a "down-count" mode. When reset to a binary ZERO by subcommand signal CSS8300, the flip-flop indicates that the counter is in an "up-count" mode.

The flip-flop 201–506 is a status flip-flop which, when set to a binary ONE, indicates that the control store 201–10 has been loaded with "personality firmware". It is switched to a binary ONE in response to subcommand signal CSS1210 and is reset to a ZERO by hold signal CSFLD1H which is forced to a ZERO when the control store panel initialize button is depressed.

The last flip-flop 201–507 is a start data move flip-flop which activates the circuits included in the data section 210–20 to move data through the adapter 200. It is switched to a binary ONE in response to subcommand signal CSS3110. The flip-flop is reset to a binary ZERO by forcing signal CSINT00 to a binary ZERO. The signal CSINT00 is forced low by the data section circuits, an S2P initialize signal or by subcommand signals.

Data Control Decode Circuits 201–40

For the most part, these circuits are similar to the circuits of FIGS. 5a through 5c. FIG. 5g shows in greater detail the circuits which condition data section 210–6 and multiplexer circuit 210–10 during the execution of CSMR and LDC microinstructions. Referring to the figure, it is seen that the control signal BSNFM10 is generated when a flip-flop 201–700 is switched to a binary ONE via an AND gate 201–702 or an AND gate 201–704 in response to either an LDC group 3 microinstruction and CSMR group 7 microinstruction, respectively. The AND gate 201–706 resets the flip-flop to a binary ONE state upon the occurrence of the next clock pulse.

S2P Control Panel Logic Circuit 201–52

Figure 5I:
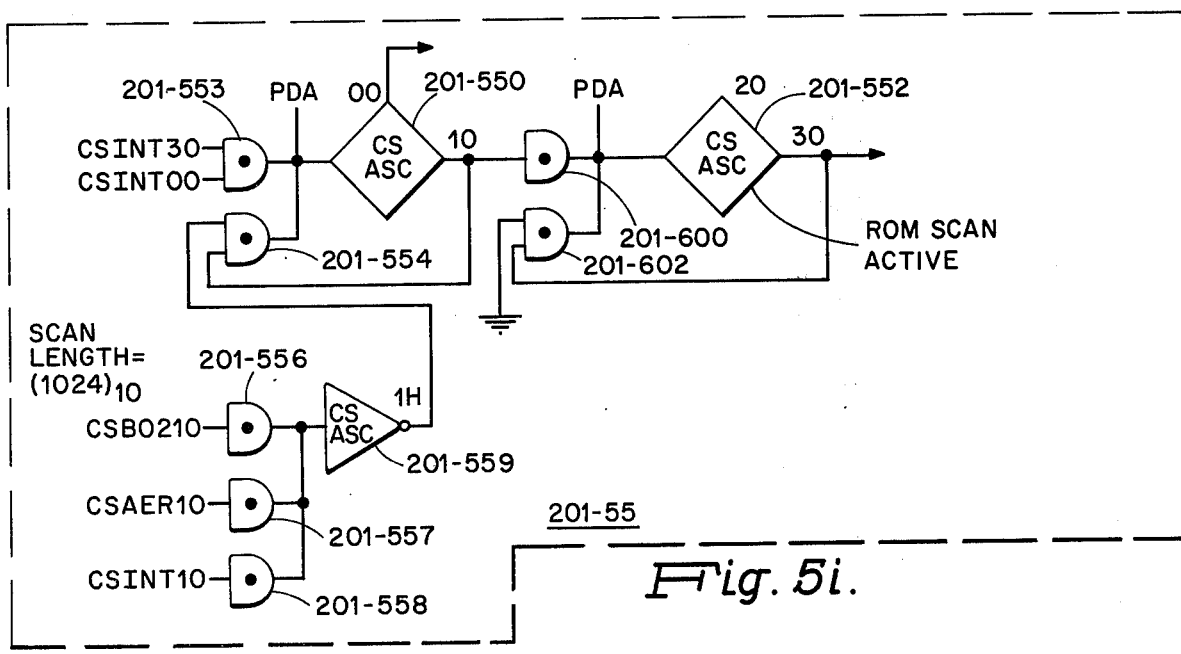

FIG. 5i shows circuits which performed a pre-scan of the control store 201–10 in accordance with the present invention. These circuits are included as part of block 201–52 for ease of explanation. Referring to the figure, it is seen that the circuits include a pair of series connected flip-flops 201–550 and 201–552. The first flip-flop is switched to a binary ONE whenever the control store initialize button is released and remains set until the scan is successfully completed (i.e., signal CSB0210 = 1), or a control store error is detected (i.e., signal CSAER10 = 1).

The second flip-flop 201–552 switches to a binary ONE via gate 201–600 one clock pulse following the switching of flip-flop 201–550 to a binary ONE. (That is the signals CSASC00 and CSASC30; CSAER00 are used to generate signal CSASCOT, end of ROM scan, which causes the control section 201 to enter the RUN mode at the completion of a successful scan.)

Read/Write and Parity Generation Circuits 201–15

The circuits generate certain control signals required for the execution of a control store write operation. Referring to the figure, it is seen that the circuits include a pair of series connected flip-flops 201–150 and 201–151. The binary ONES outputs of the flip-flops are combined in an AND gate 201–159 to cause an amplifier circuit 201–160 to produce the write control pulse CSWRT10

The flip-flop 201–151 is switched to a binary ONE in response to signal DPCSE10 generated by the depression of a control panel button and applied via gate 201–157. The AND gate 201–158 switches the flip-flop 201–151 to a binary ONE in response to a CSMW microinstruction. An AND gate 201–155 resets the flip-flop to a binary ZERO upon the occurrence of a next clock pulse.

Several of the circuits which are conditioned by signals produced from flip-flop 201–151 include a pair of flip-flops 201–161 and 201–162. The flip-flop 201–161 is switched to a binary ONE by write signal CSWT1A via and AND gate 201–163. An AND gate 201–164 also switches the flip-flop to a binary ONE in response to a CSMR group 7 micoinstruction. Upon the occurrence of a subsequent clock pulse, an AND gate 201–165 resets the flip-flop to a binary ZERO state.

The binary ONE signal from flip-flop 201–161 when applied via gate 201–166 causes flip-flop 201–162 to switch to a binary ONE. The ONE signal from this flip-flop is used to inhibit the parity check circuit 201–44 from performing a check on the address contents of CSI register 201–26 after the execution of CSMR and CSMW microinstuctions or after a control panel initiated write operation. The flip-flop 201–162 is reset via an AND gate 201–167 in response to an LCSIK group 6 microinstruction (i.e., CSIFN10 = 1), a control store initialize signal (i.e., CSINT10 = 1), or a subcommand signal (i.e., CSS7310 = 1). Thus, flip-flop 201–162 inhibits parity checking of CSI register 201–26 after a control store read or write cycle of operation until the CSI register 201–26 is again loaded with good parity via an LCSIK microinstruction, an initialize signal or firmware subcommand.

FIG. 5g also includes the parity generator circuits which generate new parity bits for a word written into control store 201–10 during the execution of a CSMW microinstruction. The parity circuits are conventional in design.

As seen from the figure, each of four parity generator circuits generates an odd parity check bit for the bits of a different one of four bytes which make up the word. The odd check bit (i.e., signals BSZEP110 through BSZP410) from each circuit is applied to a different one of a firt group of AND gates 201–174 through 201–176. The original unmodified bits (i.e., signals BSZ3210 through BSZ3510) are applied to different ones of a second group of AND gates 201–175 through 201–177, as shown.

The circuits 201–180 through 201–184 provide for either the selection of the parity bits generated by the circuits 201–170 through 201–173 (i.e., when signal CSAHP10 = 1) or the unmodified BSZ bits (signal CSAHP10 = 0). As mentioned previously, the first mode of operation consitutes a normal mode of operation which enables data to be written into scratch pad locations of control store 201-10, as explained herein. The second mode of operation, as mentioned, is used during the execution of load control store and basic logic test routines. The signals CSAUP10 and CSAGP10 are a binary ZERO and a binary ONE, respectively, when the control store 201-10 is placed in a stop mode. This allows the generation of new parity check bits in response to control panel initiated write operations notwithstanding the state of signal CSAHP10.

Parity Check Circuits and Error Circuits 201-42 through 201-45

FIG. 5h shows the parity check circuits of blocks 201-42, 201-43, and 201-44, together with associated flip-flops and gating circuits of block 201-45. Only one of the parity check circuits is shown in detail. Each parity check circuit includes two series connected parity generator circuits (i.e., circuits 201-428 and 201-426), which are conventional in design.

The first circuit performs an exclusive or of the high order eight bits of its associated register while the second circuit performs an exclusive of the low order eight bits of the same register to which it adds a carry provided by the first circuit.

When the number of ONE bits is even, the second circuit forces its output terminal to a binary ONE (i.e., signal CSAPE1A = 1) to signal an error condition.

It will be noted that some of the parity circuits receive more than one enable signal (i.e., CSHRS00, CSLOG10, CSIIC00). Normally, these signals are binary ONES which in turn enable the parity check circuits during system operation.

Each of the parity error signals CSAPE1A, CSRPE1A, and CSIPE1A is applied as an input to a corresponding one of the flip-flops 201-800 through 201-802. The flip-flop 201-800 is switched to a binary ONE by an AND gate 201-803 when signal CSWRTOA is a binary ONE (not a control panel or CSMW microinstruction write operation). The flip-flops 201-801 and 201-802 are switched to binary ONES in response to signals CSREP1A and CSIPE1A, respectively.

The binary ZERO outputs from each of the flip-flops are combined in an AND gate, the output of which is applied to a gate and inverter circuit 201-812 and to an AND gate 201-814. The circuit 201-812 forces signal CSARE10 to a binary ONE when any one of the error flip-flops 201-800 through 201-802 is switche to a binary ONE. The AND gate 201-814 combines the various types of control store errors and forces the output of an inverter circuit 201-816 to a binary ONE in response to an error. The error signals include control store parity errors detected by the circuits included as part of memory output register 201-16 (i.e., signals CSPER00 through CSPER60), control store addressing conditions (i.e., signal CSNEM00) in addition to the register parity error indicated by signal CSAER1A.

Data Section 210-8

FIG. 5f shows a portion of the data section 210-6. As indicated previously, the same arrangement of circuits is used to process the low order data bits 36-71 received from a second input multiplexer circuit, not shown.

Referring to FIG. 5f, it is seen that the section includes a group of three 36 bit labeled registers 210-900 through 210-902, BSY1 BSX1, and BSN1. The BSY1 and BSX1 registers are connected as inputs to another multiplexer circuit 201-904. The output of the circuit 210-904 is applied as source of A operand signals to an arithmetic and logic unit (ALU) 210-906. The BSN1 register serves as a source of B operand signals.

The output of the ALU 210-906 is applied to a bus BSZ and as inputs to each of the registers 210-900 through 210-902, as shown. Each of the registers also receives the output from multiplexer circuit 210-10. During the execution of group 3 microinstructions (MG310 = 1), the bit pair D1·D2 enables the delivery of the ALU output to similarity, the BSX1, BSY1, and BSN1 registers. The bit pair D5·D6 enables the delivery of the multiplexer circuit output (BSM1) to the BSX1, BSY1, and BSN1 registers when CSMG310 = 1.

DESCRIPTION OF OPERATION

The present invention will now be described with reference to FIGS. 6a and 6b. However, before referring to these figures, it is desirable to discuss to the extent necessary how the parity check bit information is generated during the assembly of microprogram routines to be loaded into the control store 201-10.

Microprogram Assembler System

It will be appreciated that the microprograms to be loaded into the control store 201-10 are assembled by a register transfer level (RTL) assembler software system. For the purposes of the present invention, this type of system can be considered conventional in design. Such systems are discussed in various papers, such as "RTL The Firmware Design Automation System", authored by Robert L. Hasterlik, published in the Eleventh Design Automation Workshop Proceedings, June 17 19, 1974.

The system makes use of a general purpose language which can be used for a wide varity of control store implementations. Parameters which form the basis of statements specify the control store/firmware implementation information about the specific design to the system. Such parameters define the size of the control store or length, the width of the control (i.e., number of bits in each control store word), the fields of each word, etc.

As discussed previously, each word is divided into one or more fields and its use is based upon the type of information which appears in the field. A parameter is used to define each field in the control store word.

One of the field types which can be specified is a parity field. A parity field is a word field, one bit in width, which is set to ZERO or ONE, based upon the contents of some other item. The parity fields are filled in by the assembler after all other fields have been filled.

The format of a basic parity field definition statement is PARITY, parity type, parity bit, parity definition. Parity type is ODD for odd parity and EVEN for even parity. The parity bit is the position number of the bit to be set by this statement. The parity definition establishes how parity is to be calculated. For check bits 32-35, parity is calculated for the different four fields of the control store word. This causes the number of bits which are set to ONES in each field to be counted. Each of the parity check bits 32-35 is set to a binary ONE to make the number of ONE bits ODD. This is also done for microinstructions which include branch addresses. That is, the parity bit is set based on the absolute value of the address referred to by the branch field.

In accordance with the present invention, parity check bit 31 is calculated on the number of ONE bits in the address of the word one forward of the current address.

The assembler system assembles the symbolic data into the control store word. A load program formats the data for loading into the word organized alterable control store. Another procedure is used for sections of the control store 201-10 organized on a chip basis. Programmable Read Only Memories (PROM's) are organized on this basis. The procedure partitions and organizes the data by board and chip and generates burn and test tapes. As explained herein, the data is loaded into control store 201-10 and the ROM sections contain the appropriate patterns. It will be appreciated that, for the purpose of the present invention, the data entered into the ROM sections and made permanent is accomplished by techniques well-known in the art. Some of these techniques are also described in U.S. Pat. No. 3,789,204, referenced previously.

The operation of the system of FIG. 2 employing the principles of the present invention will now be described with reference to FIGS. 6a and 6b.

Figure 6A:
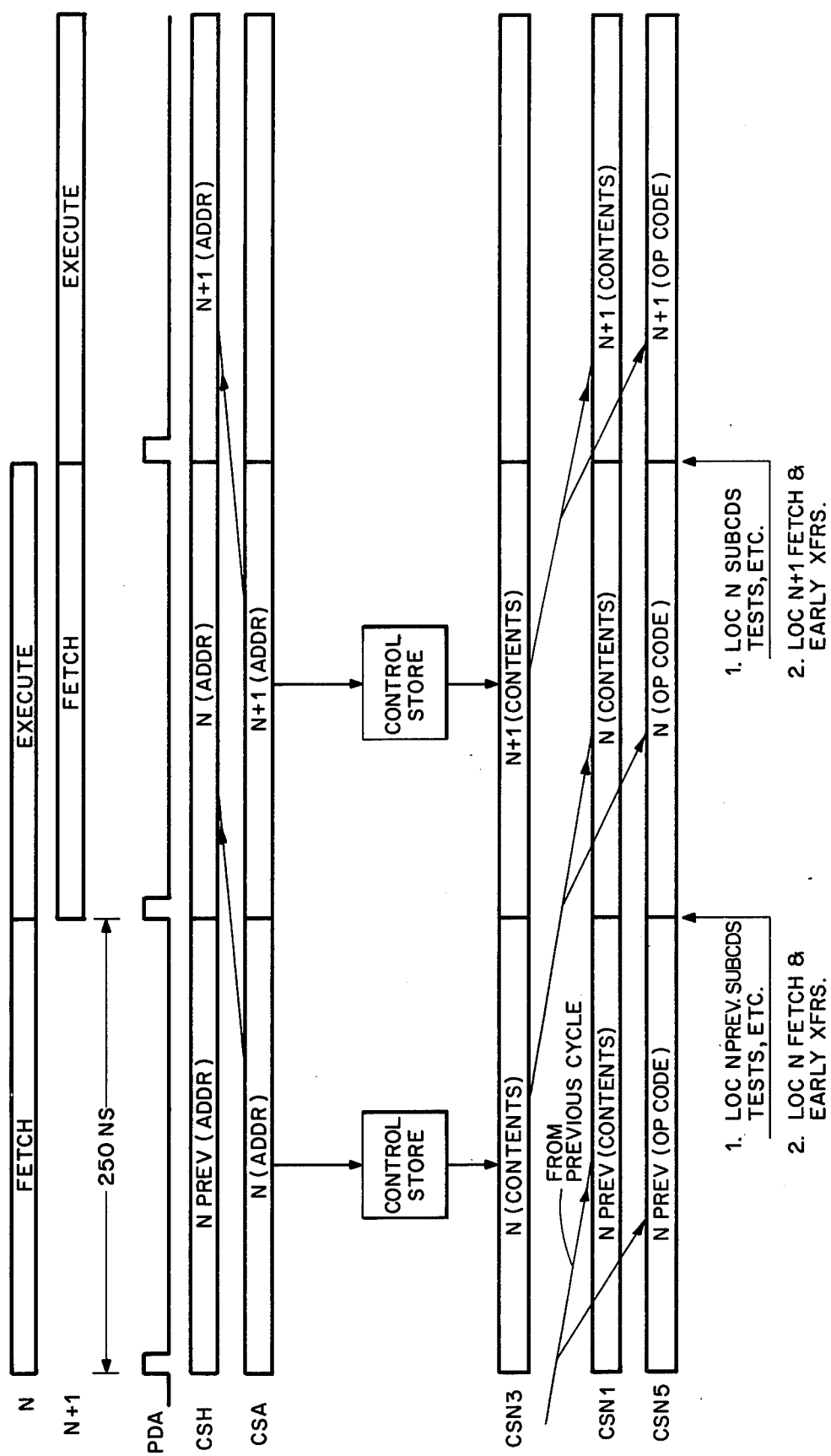
FIGS. 6a and 6b are timing diagrams used in describing the operation of the present invention.

FIG. 6a illustrates diagrammatically the manner in which microinstruction fetch and execution operations are overlapped to ensure optimum performance. Referring to the figure, typical fetch and execution phases for two microinstructions, N and N+1, are shown.

It will be noted that each microinstruction is fetched from control store 201-10 during the 250 nanosecond interval between the first and second PDA clock pulses. At the second clock pulse, the address contained in the CSA register 201-12 is incremented by one by the CSB circuit 201-20, the contents of the CSH register 201-18 are updated and the CSN1 register is loaded with signals from the CSN3 circuits. During the interval between the second and third clock pulses, the subcommands, branch conditions, and ALU operations relative to the current microinstruction N are decoded and finally performed at the third PDA clock pulse. During the PDA clock pulse interval between the second and third pulses, the next microinstruction N+1 in sequence is fetched and loaded into the CSN1 register 201-16 at the third clock pulse. Also, during the fetching interval certain register transfers are performed in the case of certain microinstructions to further improve performance. These include early transfers for microinstruction N performed at the second clock pulse and for microinstruction N+1 at the third clock pulse. Such transfers are made in response to the early transfer signals generated by the circuits of block 201-32 during the execution of certain group 6 and 7 microinstructions.

The parity check circuits 201-42, 201-43, and 201-44 ensure that the circuits which increment transfer, and store addresses within the control section 201 are operating properly during the fetching and execution of microinstructions. For example, the parity check circuit 201-42 ensures that the increment circuit 201-20 correctly increments by one the address stored in CSA regisger 201-12 and that the incremented address is correctly loaded into the CSA register 201-12. That is, the parity check circuit 201-42 checks for an ODD number of ONES in CSA register 201-12 resulting from the combination of the incremented address from circuit 201-20 and the parity check bit signal CSN31 obtained from the current microinstruction (i.e., N in FIG. 6a) word of register 201-16, both of which are loaded into the CSA register 201-12 in response to transfer signal CSAFB10 upon the occurrence of the second clock pulse.

The parity check circuit 201-42 also ensures that the transfers of address from other circuits and registers (CSN1 register 201-16, amplifier circuits 201-14, CSI register 201-26, CSR register 201-22) in response to the transfer signals indicated proceed without error. Further, it checks to see that the correct parity for branch addresses loaded into the CSA register 201-12 during the execution of group 5 microinstructions.

Similarly, the parity check circuit 201-43 ensures that the increment circuit 201-20 correctly increments by one the address stored in the CSA register 201-12 and that the incremented address is loaded correctly to CSR register 201-22. Specifically, the parity check circuit 201-43 checks for an ODD number of ONES in the incremented address from circuit 201-20 and parity check bit signal CSN31 from the current microinstruction word contained in register 201-16, both of which are loaded into CSR register 201-22 in response to transfer signal CSRFB10.

The parity check circuit 201-43 also ensures that the addresses transferred from CSA register 201-12 proceeds properly.

The third parity check circuit 201-244 ensures that the address stored in CSA register 201-12 is incremented correctly, transferred and loaded without error into CSI register 201-26. Again, this is accomplished by checking for an ODD number of ONES in the incremented address from circuit 201-20 and the parity check bit signal CSN31 obtained from CSN1 register 201-16, both of which are loaded into CSI register 201-26 in response to transfer signal CSIFB10.

The parity check circuit 201-44 also ensures that the address transfers from other circuits (i.e., amplifier circuits 201-14). However, the parity check circuit 201-44 is inhibited during the execution of CSMR and CSMW group 7 microinstructions. This is necessary since bit 31 in the next addressed location could be erroneous due to the execution of a previous CSMW microinstruction which modified the state of the bit.

From the above, it is seen how the parity check circuits ensure that the generation and transfers of addresses by the circuits of control section 201 proceed without error. From FIG. 6a, it is seen that the necessary checking is performed within a clock pulse period.

Any time that any one of the parity check circuits detects that the register associated therewith does not contain an ODD number of bits, it causes a corresponding one of the flip-flops of FIG. 5h to be switched to a binary ONE. This, in turn, forces both signals CSA-RE10 and CSAER10 to binary ONES which cause the control store 201-10 to halt further operations when signal CSHOE10 is a binary ONE.

The arrangement of the present invention also minimizes the burden on microprogram basic logic test routines by enabling the verification of address incrementing, transfers, and control store operation (i.e., fetching of microinstruction words). Such verification is performed automatically following an initialization operation.

Figure 6B:
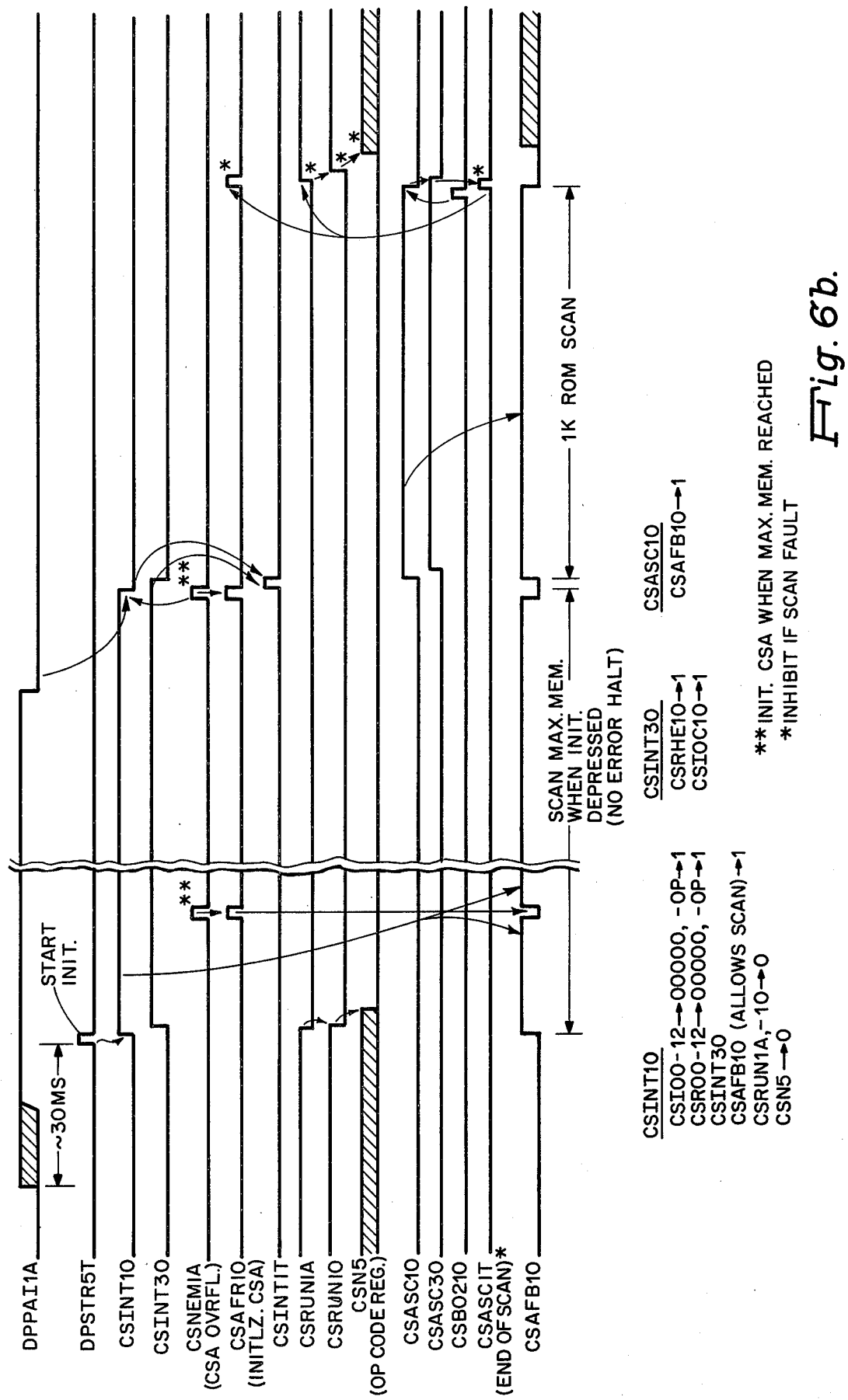

FIG. 6b illustrates the timing of the initialize and ROM scan operation. Referring to the figure, it is seen that once the control store initialize button or switch is depressed, signal DPPAI1A = 1). A locking switch is also employed to eliminate the need for having to continually depress the initialize button during field service troubleshooting.

The signal DPPAI1A triggers a one shot circuit, not shown, which sets a flip-flop. At the end of 30 milliseconds, the one shot circuit resets enabling the flip-flop to reset upon the occurrence of the next clock pulse. This produces the DPSTR5T signal. The two signals which the CSINT flip-flop 201–500 of FIG. 5e to a binary ONE (signal CSINT10).

As seen from FIG. 6b, the signal CSINT10 produced by the initialize flip-flop 201–500 in turn forces signal CSINT30 to a binary ONE. It also clears the CSR and CSI register bits 0–12, 201–22, and 201–26 to ZEROS and sets bit 13 to a ONE providing good parity.

The initialize signal also switches signal CSRUN1A to a binary ZERO which, in turn, resets the run flip-flop to a binary ZERO (i.e., CSRUN10 = 0) upon the occurrence of a next clock pulse. Since the CSRUN10 signal controls all of the register transfers, group decoder circuits, and op code register 201–30, these circuits and registers are disabled or cleared to ZEROS.

The signal CSINT30 forces the hold signal CSRHE10 to a binary ZERO. This inhibits the error flip-flops of block 201–45 from strong parity error signal detected by the circuits 201–42 through 201–44. The signal CSINT10 also causes flip-flop 201–501 of FIG. 5e to remain reset. This inhibits the system from halting operation upon the occurrence of an error condition.

It will be noted that the signal CSINT10 forces the CSAFB10 transfer signal to a binary ONE enabling the CSA register 201–12 to be incremented by one continuously. This causes the control store 201–10 to be cycled through all of the available storage locations until the maximum address has been reached. At this time, the signal CSNEM1A is forced to a binary ONE which, in turn, forces transfer signal CSAFR10 to a binary ONE. At the same time, signal CSAFB10 is forced to a binary ZERO. This causes the CSA register 201–12 to be loaded with all ZEROS and good parity from the CSR register 201–22.

The cycling through the control store 201–10 continues until the initialize button (or switch) is released. When the maximum address is again reached, signal CSNEM1A switches to a binary ONE. This re-initializes the control section 201. That is, signal CSAFR10 loads the CSA register 201–12 with ZEROS and good parity. The release of the initialize switch subsequently produces the pulse signal CSINT1T as shown in FIG. 6b. This switches the flip-flop 201–550 of FIG. 5i to a binary ONE, forcing signal CSASC10 to a binary ONE. A clock pulse later, ROM scan flip-flop 201–552 switches to a binary ONE forcing signal CSASC30 to a binary ONE. Because the CSINT10 and CSINT30 signals are ZEROS, the error flip-flops of FIG. 5h and flip-flop 201–501 of FIG. 5e are now enabled.

Signal CSASC10, in turn, causes the circuits of block 201–32 to gain force transfer signal CSAFB10 to a binary ONE enabling the CSA register 201–12 to be incremented continuously through ROM locations corresponding to octal addresses 00000 through 01777. During the scan, the detection of a register parity error, a control store memory parity error, or non-existent memory error check will cause a halt in the scan and a panel scan fault lamp to be illuminated. The contents of the CSA register 201–12 are such that the register points to an address two beyond the location during which the error was detected.

Where no error is detected throughout the scan, the signal CSBO210 is forced to a binary ONE upon the detecting that location $1024_{10}$ or 01777 has been reached. As seen from FIG. 6b, this forces the end of scam signal CSASC1T to a binary ONE, resulting in signals CSAFR10 and CSRUN1A being forced to binary ONES. The signal CSAFR10 again initializes the CSA register 201–12 while signal CSRUN1A causes the RUN mode flip-flop to be switched to a binary ONE.

Upon being switched to the RUN mode, the adapter 200 then executes the basic logic routines stored in the ROM section of control store 201–10. Upon completing the execution of the routines, the adapter 200 enters a "firmware wait loop" awaiting loading of initial test routines and finally the "personality firmware" into the writable section of control store 210–10. Loading is done in response to a command from host processor 100 (i.e., via a connect and load instruction).

From the foregoing, it is seen that the present invention provides for checking the operation of a control section of a microprogrammed processing unit with a minimum of additional logic circuits. More importantly, such checking can be performed within a minimum amount of time, automatically, during both startup and system operation.

It will be appreciated by those skilled in the art that certain changes may be made to the technique and the system of the present invention without departing from its teachings.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. A system for checking the operation of the circuits and transfer paths of a microprogrammed processing unit, said system comprising:
   a cycled addressable control store including a plurality of storage locations for storing a corresponding number of microinstruction words, each microinstruction word coded to include at least one previously calculated check bit whose state indicates a predetermined characteristic of the plurality of bits of an address of the storage location in said store previously calculated to be next in sequence;
   first address register means coupled to said store for storing said address for referencing said plurality of storage locations and operatively coupled to receive a signal corresponding to said check bit during the read out of each microinstruction word;
   second register means coupled to said store for storing at least a portion of the microinstruction word read out from an addressed location during an operative cycle of said control store;
   decoding means coupled to said second register means for generating a plurality of control signals;
   increment circuit means coupled to said first register means for incrementing said address by one; and,
   first checking means coupled to said address register means, said checking means being operative to perform continuously a checking operation upon said address and said check bit stored in said first register means in response to at least a first one of said control signals for verifying when any one of said number of circuits is not operating properly.

2. The system of claim 1 wherein said predetermined characteristic of said plurality of address bits corresponds to the number of binary ONE bits in said previously calculated address and wherein said one check bit is preset to a binary ONE state when the number of binary ONE bits is even and to a binary ZERO state when the number of said binary ONE bits is odd.

3. The system of claim 1 wherein said processing unit further includes a second address register means, said second register means being operatively coupled to said control store for receiving said check bit therefrom, to said incrementing means for receiving an incremented address therefrom, to said first address register means and to said decoding means; and, second checking means coupled to said second address register means, said checking means being operative to perform continuously a checking operation upon said address and said previously calculated check bit signal loaded into said second address register means in response to at least a second one of said control signals for detecting said predetermined characteristic to establish when any one of said circuits or transfer paths is not functioning properly.

4. The system of claim 3 wherein each of said first and second checking means is conditioned to perform the same single logical operation upon said address and check bit contents of said first and second address register means, respectively.

5. The system of claim 4 wherein each of said first and second checking means includes a plurality of exclusive or circuits and wherein said single logical operation is an exclusive or operation.

6. The system of claim 3 wherein said processing unit further includes:

third address register means coupled to said first address register means, to said increment circuit means, to said decoding means and to said control store; and, third checking means coupled to said third address register means, said checking means being operative to perform continuously a checking operation upon said address and said previously calculated check bit loaded into said third address register means in response to at least a third one of said control signals for detecting said predetermined characteristic to establish when anyone of said circuits or transfer paths is not functioning properly.

7. The system of claim 6 wherein said processing unit further includes:

input circuit means for receiving an initialization signal, said input circuit means being coupled to said second and third address register means, said input circuit means being conditioned by said initialization signal to force both said second and third address registers to a predetermined address and set a check bit to a predetermined state for proper detection of said predetermined characteristic;

said first address register means being conditioned continuously by said first one of said control signals to be loaded with said incremented address and said check bit for cycling said control store through said plurality of storage locations;

said decoding means including circuit means coupled to said second register means for inhibiting the transfer of each microinstruction word read out from each addressed location to said second register means during the cycling of said control store; and, said first checking means performing said checking operation upon said address and check bit contents for detecting said predetermined characteristic to verify the correctness of the contents of each storage location and the operation of said incrementing circuit means thereby reducing the number of test routines normally required for testing all of said circuits and transfer paths when said unit is being tested.

8. The system of claim 7 wherein said predetermined address is all ZEROS and said predetermined state of said check bit corresponds to a binary ZERO.

9. A method for checking the operation of a microprogrammed processing unit comprising a number of circuits including a cycled addressable control store including a plurality of storage locations for storing a corresponding number of microinstruction words, an address register coupled to said store for storing an address having a plurality of bits for addressing any one of said plurality of storage locations and output storage means coupled to said store for receiving at least a portion of the microinstruction word contents of an addressed location during a cycle of operation of said control store used for directing the operation of said processing unit during said cycle, said method comprising the steps of:

a. coding each microinstruction word to include at least one previously calculated check bit whose state indicates a predetermined characteristic of the said plurality of bits of an address of the storage location previously calculated to be next in sequence;

b. incrementing by one of the address stored in said address register during said cycle of operation;

c. loading simultaneously said incremented address contents and said one check bit from said control store into said register means in response to a first transfer signal; and, d. performing a checking operation upon said address and said check bit contents of said address register for detecting said characteristic to verify that said circuits of processing unit are operating properly.

10. The method of claim 9 wherein said predetermined characteristic of said plurality of address bits corresponds to the number of binary ONE bits in said previously calculated address and wherein said one check bit is preset to a binary ONE state when the number of binary ONE bits is even and to a binary ZERO state when the number of said binary ONE bits is odd.

11. The method of claim 9 wherein said processing unit further includes at least a first address control register, said control register being operatively coupled to said control store to receive said check bit therefrom and coupled to receive said incremented address derived from said address register, said method further including the steps of:

e. loading simultaneously said incremented address and said previously calculated check bit from said store into said control register in response to a second transfer signal; and, f. performing a checking operation upon said address and said check bit contents of said first register for detecting said predetermined characteristic for establishing that said circuits of processing unit are operating properly.

12. The method of claim 11 wherein said method further includes the steps of:

g. generating an error signal upon detecting an error condition during the performance of step (d) or step (f) for inhibiting further incrementing of said address preventing cycling of said control store.

13. The method of claim 11 wherein each of the checking of steps (d) and (f) is performed by a single logical operation upon said address bits and said check bit thereby enabling verification of circuit operation during each cycle of operation.

14. The method of claim 13 wherein said single logical operation is an exclusive or operation.

15. The method of claim 11 wherein said processing unit further includes a second address control register coupled to said address register and coupled to receive said incremented address and said one check bit from said control store, said method further including the steps of:

h. loading said incremented address contents and said one check bit from said store simultaneously into said second control register in response to a third transfer signal; and, i. performing a checking operation upon said address and check bit contents of said third register for said given chracteristic for determining that said circuits of said processing unit are operating properly.

16. The method of claim 15 wherein said checking operation of steps (d), (f), and (i) are performed continuously during each cycle of operation.

17. The method of claim 15 wherein said number of circuits includes input circuit means coupled to said first and second registers and said method further including the steps of:

applying an initialization signal to said input means for forcing each of said first and second control registers to store a predetermined address and check bit set to a predetermined state for proper detection of said predetermined characteristic;

incrementing continuously by one the address stored in said register to cycle said control store through said plurality of storage locations;

inhibiting the receipt by said storage means of each microinstruction word read out from each addressed location during each cycle of operation;

loading simultaneously said incremented address and said one check bit from store into said register means; and, performing said checking operation continuously upon said address and said check bit for said predetermined characteristic to verify the correctness of the contents of said control store and incrementing step thereby reducing the number of test routines normally required for testing all of said circuits of said processing unit when said unit is being tested.

18. The method of claim 17 wherein said predetermined address is all ZEROS and said predetermined state of said check bit corresponds to a binary ONE.

19. A self checking microprogrammed processing system including a number of circuits comprising:

a cycled addressable control store including a plurality of storage locations for storing a corresponding number of microinstruction words, each microinstruction word coded to include a previously calculated parity check bit whose state designates the number binary ONES included in an address of the storage location previously calculated to be next in sequence;

a first address register coupled to said store for storing an address for referencing each of said plurality of storage locations;

a second register coupled to said store for storing at least a portion of the microinstruction word read out from an addressed location during an operative cycle of said control store;

decoder circuit means coupled to said second register for generating a plurality of control signals in response to each microinstruction word stored in said register;

circuit means coupled to said control store for applying a signal corresponding to said parity check bit to said first address register;

an increment circuit coupled to said first address register for incrementing said address by one; and, a parity check circuit coupled to said first address register, said check circuit being enabled to perform continuously a parity checking operation upon said address and said parity check bit stored in said first register in response to said control signals for verifying when any one of said number of circuits is no operating properly.

20. The system of claim 19 wherein said number of circuits further includes:

a plurality of address control registers, each being operatively coupled to said control store for receiving signals corresponding to said previously calculated parity check bit and to said increment circuit for receiving and incremented address, said plurality of address control registers being coupled to said decoder circuit means; and, a plurality of parity check circuits, each of said circuits being coupled to a different one of said plurality of address control registers, each of said parity check circuits being enabled to perform continuously upon said address and said parity check bit signal stored in a corresponding one of said address control registers in response to said control signals for detecting when any one of said number of circuits is not functioning properly.

21. The system of claim 20 wherein said number of circuits further includes:

input circuit means for receiving an initialization signal, said input circuit means being coupled to said plurality of control address registers, said input circuit means being conditioned by said initialization signal to force said control address registers to store an all ZERO address and a check bit set to a binary ONE for proper detection of said parity check bit;

said first address register being conditioned continuously by different ones of said control signals to be loaded with said incremented address and said parity check bit for cycling said control store through said plurality of storage locations;

said decoder circuit means including circuit means coupled to said second register for inhibiting the transfer of each microinstruction word read out from each addressed location to said second register during the cycling of said control store;

means being operative upon detecting the absence of said initialization signal when said control store is cycled to a storage location having a predetermined maximum addresss to generate a control signal for loading said first address register from a predetermined one of said plurality of control address registers;

said circuit means decoder circuit means generating signals for again loading said first address register with said incremented address and said parity check bit for again cycling said control store from said all ZERO address to a predetermined address; and, said parity check circuit coupled to said first address register being conditioned to perform said parity check upon said address and check bit contents for verifying the correctness of each storage location accessed in the absence of said initialization signal and the operation of said increment circuit thereby reducing the number of test routines normally required for testing said unit.

22. The system of claim 21 wherein said storage locations having addressed corresponding to said all ZERO address through said predetermined address constitute read only memory.

* * * * *

UNITED STATES PATENT OFFICE
CERTIFICATE OF CORRECTION

Patent No. 4,019,033     Dated April 19, 1977

Inventor(s) Arthur A. Parmet

It is certified that error appears in the above-identified patent and that said Letters Patent are hereby corrected as shown below:

Column 27, line 45, before "check" insert --a--.

Column 27, line 66, delete "checking" and insert --checked--.

Column 28, line 38, delete "and" and insert --said--.

Column 29, line 6, delete "addresss" and insert -- address --.

Column 30, line 11, delete "addressed" and insert -- addresses --.

Column 30, line 13, after "memory" insert --circuits--.

Signed and Sealed this

Thirteenth Day of June 1978

[SEAL]

Attest:

RUTH C. MASON
Attesting Officer

DONALD W. BANNER
Commissioner of Patents and Trademarks